US011900831B1

(12) United States Patent
Blahnik

(10) Patent No.: US 11,900,831 B1
(45) Date of Patent: Feb. 13, 2024

(54) FITNESS AND SOCIAL ACCOUNTABILITY

(71) Applicant: Apple Inc., Cupertino, CA (US)

(72) Inventor: Jay Blahnik, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 273 days.

(21) Appl. No.: 17/110,164

(22) Filed: Dec. 2, 2020

Related U.S. Application Data

(63) Continuation of application No. 15/252,010, filed on Aug. 30, 2016, now Pat. No. 10,872,536.

(60) Provisional application No. 62/235,507, filed on Sep. 30, 2015.

(51) Int. Cl.
*A63F 9/24* (2006.01)
*G09B 5/08* (2006.01)
*G09B 5/02* (2006.01)
*G06Q 10/10* (2023.01)
*G09B 19/00* (2006.01)
*G06Q 50/00* (2012.01)

(52) U.S. Cl.
CPC .............. *G09B 5/08* (2013.01); *G06Q 10/10* (2013.01); *G09B 5/02* (2013.01); *G09B 19/0038* (2013.01); *G06Q 50/01* (2013.01)

(58) Field of Classification Search
CPC ................ A63B 24/0062; A63B 24/0075
See application file for complete search history.

(56) References Cited

U.S. PATENT DOCUMENTS

| 2013/0325394 | A1* | 12/2013 | Yuen ................... | A61B 5/1123 702/150 |
| 2014/0012117 | A1* | 1/2014 | Mensinger ............. | A61B 5/742 600/365 |
| 2014/0143031 | A1* | 5/2014 | Tropper ............... | A61B 5/6897 705/14.1 |
| 2014/0164611 | A1 | 6/2014 | Molettiere et al. | |

OTHER PUBLICATIONS

"Non-Final Office Action," dated Jan. 28, 2019 in U.S. Appl. No. 15/252,010. 8 pages.
"Non-Final Office Action," dated Apr. 19, 2018 in U.S. Appl. No. 15/252,010. 7 pages.

(Continued)

*Primary Examiner* — David L Lewis
*Assistant Examiner* — Eric M Thomas
(74) *Attorney, Agent, or Firm* — Kilpatrick Townsend and Stockton LLP

(57) ABSTRACT

Techniques described herein include receiving selection of information identifying one or more members for participating in a fitness session, a start time for the fitness session, and a duration of the fitness session. The techniques also includes receiving individual fitness metrics for the one or more members associated with the fitness session, the individual fitness metrics collected during a period of time corresponding to the start time and the duration of the fitness session. The techniques also includes presenting aggregate fitness data for the fitness session corresponding to the received individual fitness metrics for the one or more members associated with the fitness session during the period of time, and presenting at least a subset of the received individual fitness metrics for the one or more members associated with the fitness session during the period of time.

20 Claims, 26 Drawing Sheets

(56) References Cited

OTHER PUBLICATIONS

"Non-Final Office Action," dated Jul. 29, 2019 in U.S. Appl. No. 15/252,010. 10 pages.
"Notice of Allowance," dated Apr. 6, 2020 in U.S. Appl. No. 15/252,010. 7 pages.

* cited by examiner

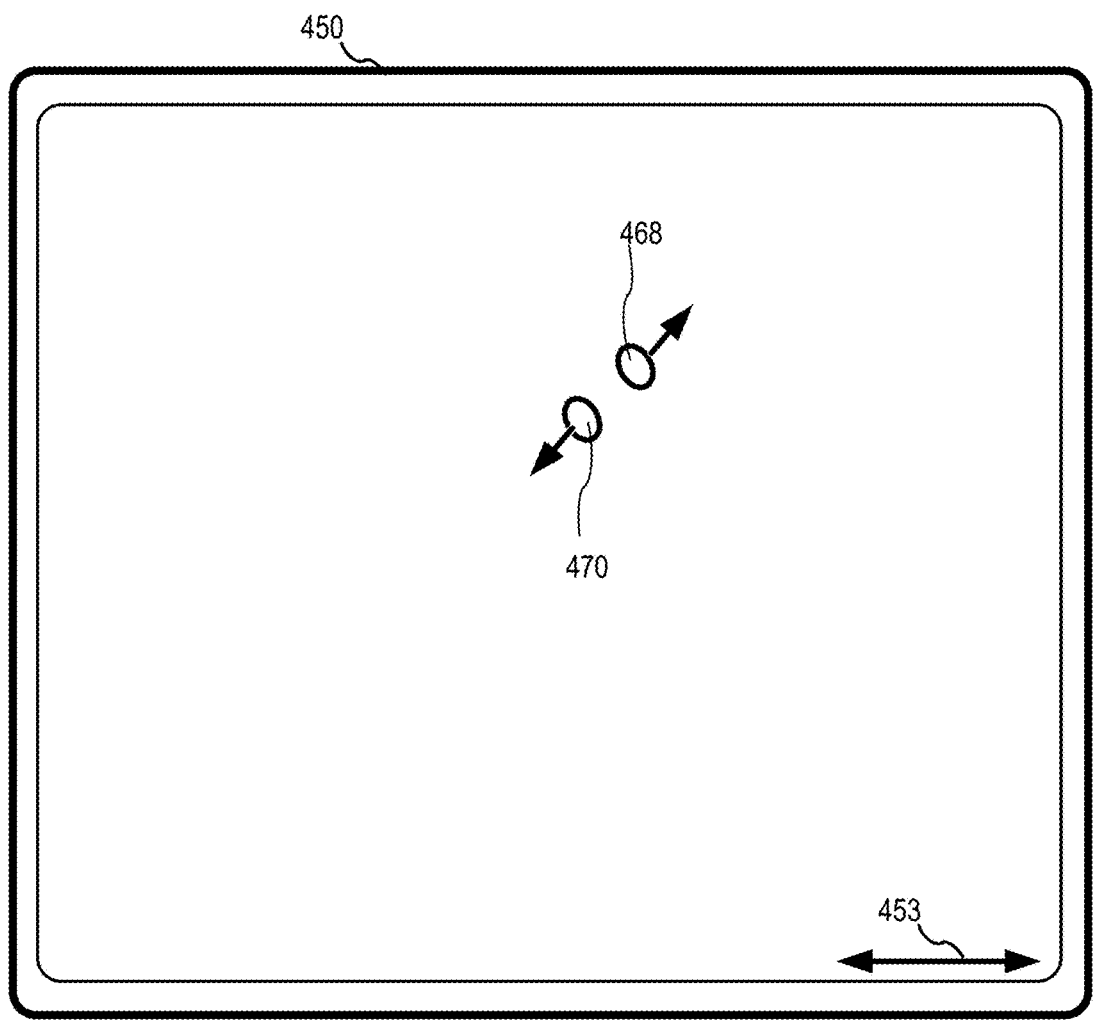
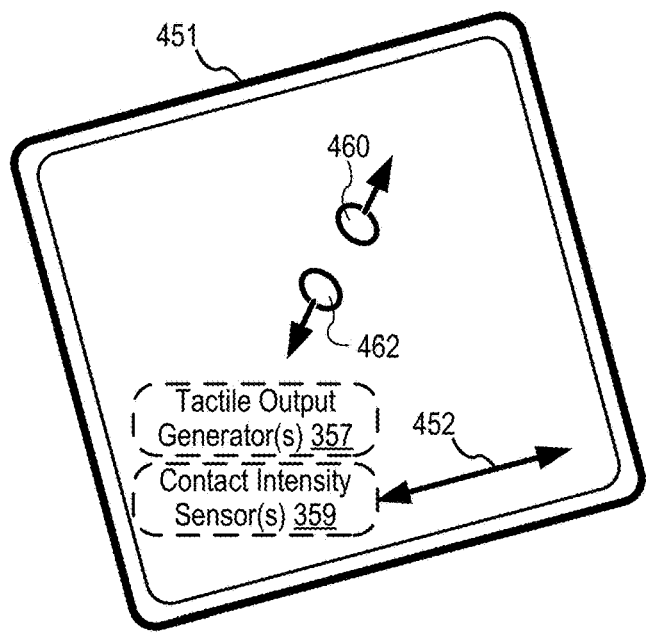
*FIG. 4B*

900

---

902
Receive, by a user interface of the electronic device, a group type selection input of a group type from among a plurality of group types.

↓

904
Receive, by the user interface, a member selection input of one or more group members.

906
Display a list of contacts on the electronic device.

↓

908
Receive, by the user interface, a selection of one or more contacts from the displayed list of contacts.

910
Display a list of contacts on the electronic device, the list providing an indication associating one or more contacts with a predetermined electronic device type.

↓

912
Receive a selection of one or more contacts associated with the predetermined electronic device type.

914
Determine, by a notification control module, fitness related notification receipt parameters for the one or more group members based on at least the selected group type, wherein the notification receipt parameters include at least one notification receipt frequency and at least one notification receipt information type.

916
Determine fitness related notification receipt parameters for the one or more group members to enable a member of the one or more group members to asymmetrically receive fitness related notifications from one or more other group members.

918
Determine fitness related notification receipt parameters for the one or more group members enabling each group member to symmetrically receive data from one or more other group members.

920
Determine notification receipt parameters for the one or more group members based on a number of group members.

1002
Receive, from an external device, data indicative of an aggregate progress of a group of members in reaching each of their individual fitness goals.

1004
Display, using the touch-sensitive display, a group goal progress indicator, indicative of the aggregate progress of the group of members.

1006
Display at least one of a completion date or a completion time associated with the goal progress indicator.

1008
Determine, using a sensor of the electronic device, individual goal progress of a wearer of the electronic device.

1102
Receive, by a user interface, for a fitness module app running on the electronic device:
a selection of a fitness session having a fitness session type;
a selection of members for participating in the fitness session; and
a selection of a start time and duration of the fitness session.

1104
Configure notification transmit parameters for at least one of the members.

1106
Display a set of notifications from at least one of the members at a rate, wherein the rate is based on the fitness session type.

1108
Display different specificities of fitness data for each fitness session type.

1110
Display non-specific fitness data for a team fitness session type.

1112
Provide an automated response to at least one notification of the set of notifications.

1114
Receive fitness data associated with at least one member.

1116
Provide a second set of notifications to one or more of the members.

1118
Receive fitness data from a wearable device.

1120
Provide the fitness data to at least one of the members.

*FIG. 11*

FITNESS AND SOCIAL ACCOUNTABILITY

CROSS-REFERENCE TO RELATED APPLICATIONS

This application is a continuation of U.S. application Ser. No. 15/252,010, filed Aug. 30, 2016, entitled "FITNESS AND SOCIAL ACCOUNTABILITY" which claims priority to U.S. Provisional application No. 62/235,507, filed Sep. 30, 2015, entitled "FITNESS AND SOCIAL ACCOUNTABILITY" which are hereby incorporated by reference in their entirety for all purposes.

FIELD

The present disclosure relates generally to management of user physical activity, and more specifically, to computer-based processes and devices for motivating and managing user physical activity.

BACKGROUND

Millions of Americans suffer from at least one chronic health condition. In many cases, this deterioration is largely attributable to sedentary lifestyles reflecting insufficient physical activity. For example, lack of sufficient physical activity can increase the risk of developing diabetes, hypertension, colon cancer, depression and anxiety, obesity, and weak muscles and bones. In addition, recent studies have found that extended periods of inactivity (e.g., sitting at a desk) can lead to serious health risks, such as an increased risk of a heart attack.

BRIEF SUMMARY

To improve the health of individuals, various tools for managing user health and physical activity have been developed. For example, activity monitors can track individual physical activity using various metrics such as steps taken, elevation climbed, distance traveled, calories burned, and the like. While these monitors can track the amount of physical activity performed by a user, they fail to properly motivate users to engage in physical activity. In many instances, such monitors operate solely on an individual basis, and therefore fail to take advantage of group-based motivators of physical activity. Moreover, such activity monitors may use complex and time-consuming user interfaces, which may require excessive key presses or user inputs. Thus, existing techniques may require more time than necessary, wasting user time and device energy. This latter consideration is particularly important in battery-operated devices.

Systems and processes for motivating and managing user physical activity are provided herein. These systems and processes are implemented using electronic devices with faster, more efficient methods and interfaces for motivating and managing user physical activity. Such methods and interfaces optionally complement or replace other methods for managing event notifications, particularly activity-based notifications in a group environment. Such methods and interfaces reduce the cognitive burden on a user and produce a more efficient human-machine interface. For battery-operated computing devices, such methods and interfaces conserve power and increase the time between battery charges. In some embodiments described herein, the systems and processes provide for efficient notification management relating to user and group physical activity, thereby reducing the number of unnecessary or extraneous human-machine interactions and improving device functionality and efficiency.

In accordance with one example, a method includes, at an electronic device, receiving, by a user interface of the electronic device, a group type selection input of a group type from among a plurality of group types and receiving, by the user interface, a member selection input of one or more group members. The method further includes determining, by a notification control module, fitness related notification receipt parameters for the one or more group members based on at least the selected group type, wherein the notification receipt parameters include at least one notification receipt frequency and at least one notification receipt information type. The method further includes determining, by the notification control module, fitness related notification transmit parameters for the one or more group members based on at least the selected group type, wherein the notification transmit parameters include at least one notification transmit information type. The method further includes creating, by a group tracking module, a group having the selected group type, the selected one or more group members, notification receipt parameters, and notification transmit parameters.

In accordance with one example, a method includes, at an electronic device having a touch-sensitive display, receiving, from an external device, data indicative of an aggregate progress of a group of members in reaching each of their individual fitness goals, and displaying, using the touch-sensitive display, a group goal progress indicator, indicative of the aggregate progress of the group of members. The method further includes displaying, using the touch-sensitive display, a plurality of individual goal progress indicators, each of the plurality of goal progress indicators corresponding to a respective user of the group of members. In some examples, a first metric of the fitness goal of the first member is different from a second metric of the fitness goal of the second member.

In accordance with one example, a method includes, at an electronic device, receiving, by a user interface, for a fitness module app running on the electronic device: a selection of a fitness session having a fitness session type, a selection of members for participating in the fitness session, and a selection of a start time and duration of the fitness session. The method further includes configuring notification transmit parameters for at least one of the members and displaying a set of notifications from at least one of the members at a rate, wherein the rate is based on the fitness session type.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

In accordance with one example, a non-transitory computer-readable storage medium stores one or more programs comprising instructions, which when executed by one or more processors of an electronic device having a touch-sensitive display, cause the electronic device to receive, by a user interface of the electronic device, a group type selection input of a group type from among a plurality of group types; and receive, by the user interface, a member selection input of one or more group members. The instructions further cause the electronic device to determine, by a notification control module, fitness related notification receipt parameters for the one or more group members based on at least the selected group type, wherein the notification receipt parameters include at least one notification receipt frequency and at least one notification receipt information type; determine, by the notification control module, fitness related notification transmit parameters for the one or more group members based on at least the selected group type, wherein the notification transmit parameters include at least one notification transmit information type; and create, by a group tracking module, a group having the selected group type, the selected one or more group members, notification receipt parameters, and notification transmit parameters.

In accordance with one example, a non-transitory computer-readable storage medium stores one or more programs comprising instructions, which when executed by one or more processors of an electronic device having a touch-sensitive display, cause the electronic device to receive, from an external device, data indicative of an aggregate progress of a group of members in reaching each of their individual fitness goals; display, using the touch-sensitive display, a group goal progress indicator, indicative of the aggregate progress of the group of members; and display, using the touch-sensitive display, a plurality of individual goal progress indicators. In some examples, each of the plurality of goal progress indicators correspond to a respective user of the group of members and a first metric of the fitness goal of the first member is different from a second metric of the fitness goal of the second member.

In accordance with one example, a non-transitory computer-readable storage medium stores one or more programs comprising instructions, which when executed by one or more processors of an electronic device having a touch-sensitive display, cause the electronic device to receive, by a user interface, for a fitness module app running on the electronic device: a selection of a fitness session having a fitness session type, a selection of members for participating in the fitness session, and a selection of a start time and duration of the fitness session. The instructions further cause the electronic device to configure notification transmit parameters for at least one of the members; and display a set of notifications from at least one of the members at a rate. The rate is based on the fitness session type in some examples.

In accordance with one example, a transitory computer-readable storage medium stores one or more programs comprising instructions, which when executed by one or more processors of an electronic device having a touch-sensitive display, cause the electronic device to receive, by a user interface of the electronic device, a group type selection input of a group type from among a plurality of group types; and receive, by the user interface, a member selection input of one or more group members. The instructions further cause the electronic device to determine, by a notification control module, fitness related notification receipt parameters for the one or more group members based on at least the selected group type, wherein the notification receipt parameters include at least one notification receipt frequency and at least one notification receipt information type; determine, by the notification control module, fitness related notification transmit parameters for the one or more group members based on at least the selected group type, wherein the notification transmit parameters include at least one notification transmit information type; and create, by a group tracking module, a group having the selected group type, the selected one or more group members, notification receipt parameters, and notification transmit parameters.

In accordance with one example, a transitory computer-readable storage medium stores one or more programs comprising instructions, which when executed by one or more processors of an electronic device having a touch-sensitive display, cause the electronic device to receive, from an external device, data indicative of an aggregate progress of a group of members in reaching each of their individual fitness goals; display, using the touch-sensitive display, a group goal progress indicator, indicative of the aggregate progress of the group of members; and display, using the touch-sensitive display, a plurality of individual goal progress indicators. In some examples, each of the plurality of goal progress indicators correspond to a respective user of the group of members and a first metric of the fitness goal of the first member is different from a second metric of the fitness goal of the second member.

In accordance with one example, a transitory computer-readable storage medium stores one or more programs comprising instructions, which when executed by one or more processors of an electronic device having a touch-sensitive display, cause the electronic device to receive, by a user interface, for a fitness module app running on the electronic device: a selection of a fitness session having a fitness session type, a selection of members for participating in the fitness session, and a selection of a start time and duration of the fitness session. The instructions further cause the electronic device to configure notification transmit parameters for at least one of the members; and display a set of notifications from at least one of the members at a rate. The rate is based on the fitness session type in some examples.

In accordance with one example, a device includes one or more processors, a user interface, a memory, and one or more programs. The one or more programs are stored in the memory and configured to be executed by the one or more processors. The one or more programs include instructions for receiving, by the user interface, a group type selection input of a group type from among a plurality of group types and receiving, by the user interface, a member selection input of one or more group members. The one or more programs include instructions for determining, by a notification control module, fitness related notification receipt parameters for the one or more group members based on at least the selected group type, wherein the notification receipt parameters include at least one notification receipt frequency and at least one notification receipt information type; determining, by the notification control module, fitness related notification transmit parameters for the one or more group members based on at least the selected group type, wherein the notification transmit parameters include at least one notification transmit information type; and creating, by a group tracking module, a group having the selected group type, the selected one or more group members, notification receipt parameters, and notification transmit parameters.

In accordance with one example, a device includes one or more processors, a touch-sensitive display, a memory, and one or more programs. The one or more programs are stored in the memory and configured to be executed by the one or more processors. The one or more programs include instructions for receiving, from an external device, data indicative of an aggregate progress of a group of members in reaching each of their individual fitness goals and displaying, using the touch-sensitive display, a group goal progress indicator, indicative of the aggregate progress of the group of members. The one or more programs include instructions for displaying, using the touch-sensitive display, a plurality of individual goal progress indicators. In some examples, each of the plurality of goal progress indicators correspond to a respective user of the group of members and a first metric of the fitness goal of the first member is different from a second metric of the fitness goal of the second member.

In accordance with one example, a device includes one or more processors, a user interface, a memory, and one or more programs. The one or more programs are stored in the memory and configured to be executed by the one or more processors. The one or more programs include instructions for receiving, by the user interface, for a fitness module app running on the electronic device: a selection of a fitness session having a fitness session type, a selection of members for participating in the fitness session; and a selection of a start time and duration of the fitness session. The one or more programs include instructions for configuring notification transmit parameters for at least one of the members and displaying a set of notifications from at least one of the members at a rate. The rate is based on the fitness session type in some examples.

In accordance with one example, an electronic device includes means for receiving a group type selection input of a group type from among a plurality of group types and means for receiving a member selection input of one or more group members. The electronic device further includes means for determining fitness related notification receipt parameters for the one or more group members based on at least the selected group type, wherein the notification receipt parameters include at least one notification receipt frequency and at least one notification receipt information type and means for determining fitness related notification transmit parameters for the one or more group members based on at least the selected group type. In some examples the notification transmit parameters include at least one notification transmit information type. The electronic device further includes means for creating a group having the selected group type, the selected one or more group members, notification receipt parameters, and notification transmit parameters.

In accordance with one example, an electronic device includes means for receiving, from an external device, data indicative of an aggregate progress of a group of members in reaching each of their individual fitness goals; means for displaying a group goal progress indicator, indicative of the aggregate progress of the group of members; and means for displaying a plurality of individual goal progress indicators, each of the plurality of goal progress indicators corresponding to a respective user of the group of members. In some examples, a first metric of the fitness goal of the first member is different from a second metric of the fitness goal of the second member.

In accordance with one example, an electronic device includes means for receiving for a fitness module app running on the electronic device: a selection of a fitness session having a fitness session type, a selection of members for participating in the fitness session, and a selection of a start time and duration of the fitness session. The electronic device further includes means for configuring notification transmit parameters for at least one of the members and means for displaying a set of notifications from at least one of the members at a rate, wherein the rate is based on the fitness session type.

In accordance with one example, an electronic device includes a user interface and a processing unit. The processing unit is configured to receive, by the user interface, a group type selection input of a group type from among a plurality of group types; receive, by the user interface, a member selection input of one or more group members; and determine, by a notification control module, fitness related notification receipt parameters for the one or more group members based on at least the selected group type, wherein the notification receipt parameters include at least one notification receipt frequency and at least one notification receipt information type. The processing unit is further configured to determine, by the notification control module, fitness related notification transmit parameters for the one or more group members based on at least the selected group type, wherein the notification transmit parameters include at least one notification transmit information type; and create, by a group tracking module, a group having the selected group type, the selected one or more group members, notification receipt parameters, and notification transmit parameters.

In accordance with one example, an electronic device includes a touch-sensitive display and a processing unit configured to receive, from an external device, data indicative of an aggregate progress of a group of members in reaching each of their individual fitness goals; enable display of, using the touch-sensitive display, a group goal progress indicator, indicative of the aggregate progress of the group of members; and enable display of, using the touch-sensitive display, a plurality of individual goal progress indicators, each of the plurality of goal progress indicators corresponding to a respective user of the group of members. In some examples, a first metric of the fitness goal of the first member is different from a second metric of the fitness goal of the second member.

In accordance with one example, an electronic device includes a user interface and a processing unit. The processing unit may be configured to receive, by the user interface, for a fitness module app running on the electronic device: a selection of a fitness session having a fitness session type, a selection of members for participating in the fitness session, and a selection of a start time and duration of the fitness session. The processing unit may further be configured to configure notification transmit parameters for at least one of the members and enable display of a set of notifications from at least one of the members at a rate. The rate is based on the fitness session type in some examples.

Thus, devices are provided with improved methods and interfaces for motivating user physical activity, thereby increasing the effectiveness, efficiency, and user satisfaction with such devices. Such methods and interfaces may complement or replace other methods for motivating user physical activity.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 9A-9C illustrates a process for creating a fitness group in accordance with some embodiments.

FIGS. 10A-10B illustrates a process for displaying fitness progress in accordance with some embodiments.

FIG. 11 illustrates a process for creating a fitness session in accordance with some embodiments.

DESCRIPTION OF EMBODIMENTS

Figure 1A:
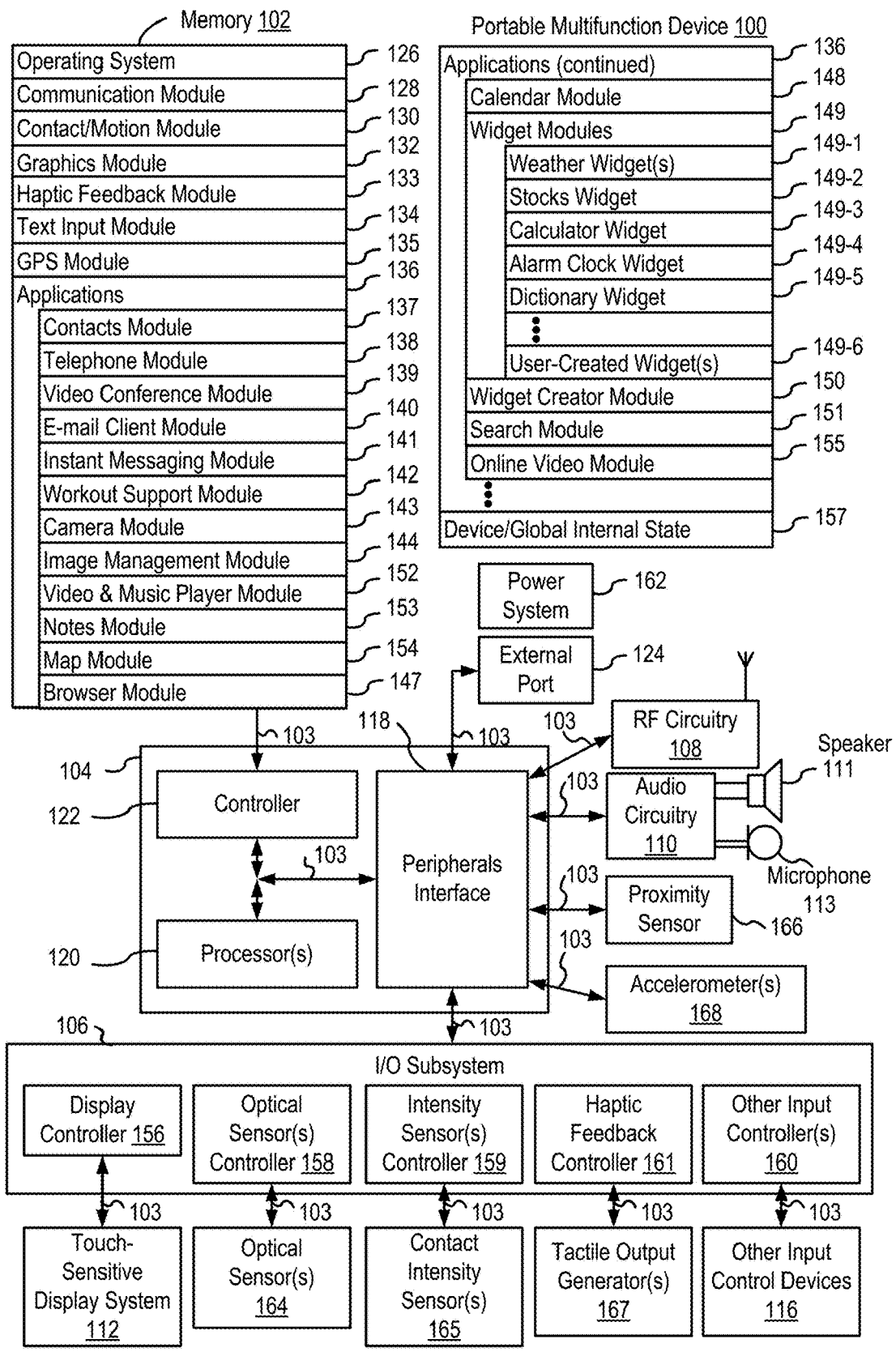
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure, but is instead provided as a description of exemplary embodiments.

Below, FIGS. 1A-1B, 2, 3, 4A-4B, and 5A-5B provide a description of exemplary devices for performing the techniques for motivating user physical activity. FIG. 6A illustrates exemplary user interfaces for creating a fitness group. FIG. 9A-C is a flow diagram illustrating methods of creating a fitness group in accordance with some embodiments. The user interfaces in FIG. 6A are used to illustrate the processes described below, including the process in FIG. 9A-C. FIG. 6B illustrates exemplary user interfaces for creating a fitness session. FIG. 11 is a flow diagram illustrating methods of creating a fitness session in accordance with some embodiments. The user interfaces in FIG. 6B is used to illustrate the processes described below, including the process in FIG. 11. The user interfaces in FIGS. 8A-8F illustrate exemplary user interfaces for displaying fitness progress in accordance with some embodiments. The user interfaces in FIGS. 8A-8F are used to illustrate the processes described below, including the process in FIG. 10A-B.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system."

Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes one or more computer-readable storage mediums. The computer-readable storage mediums are optionally tangible and non-transitory. The computer-readable storage mediums are optionally transitory. Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons is, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touch-screen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
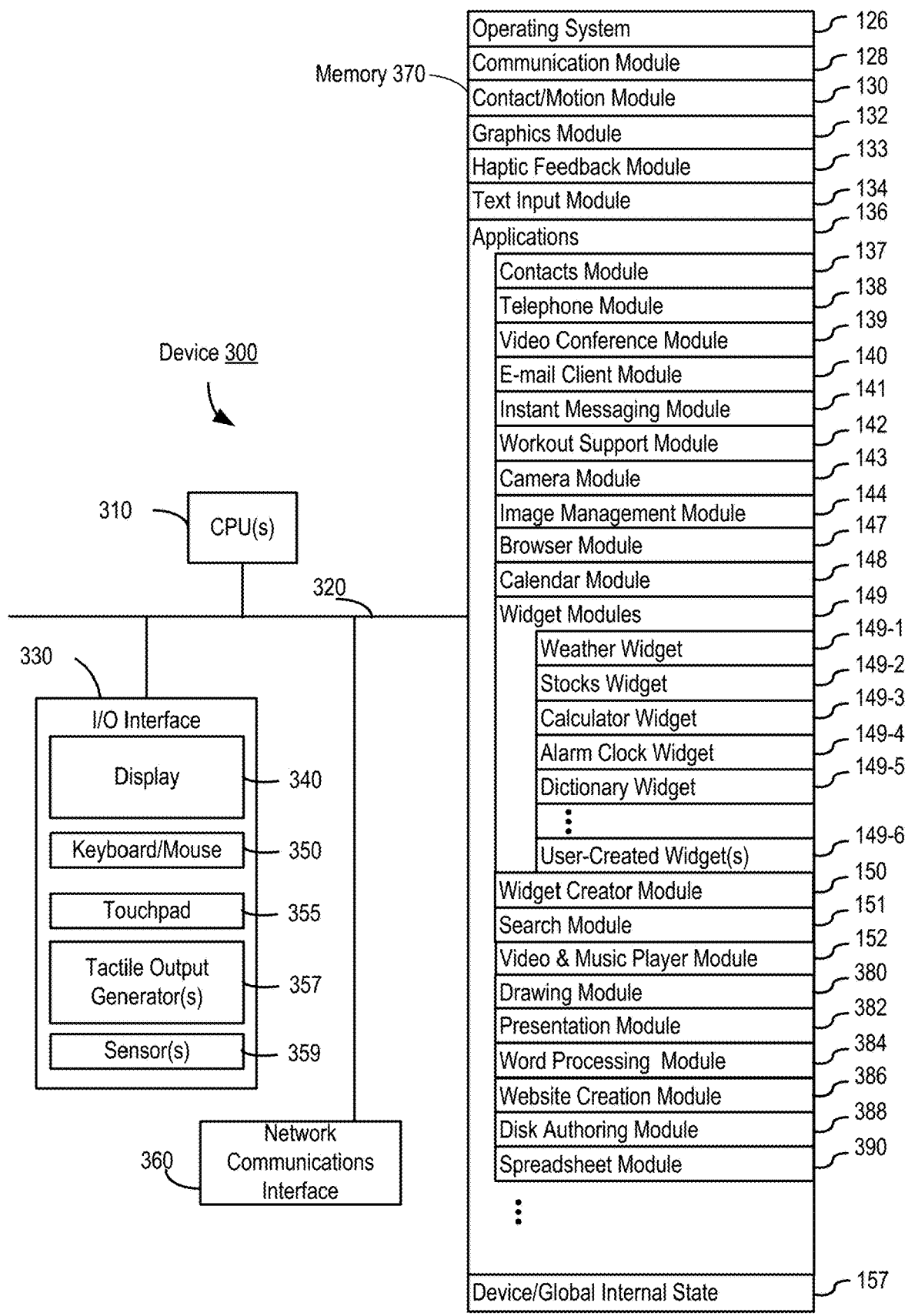
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
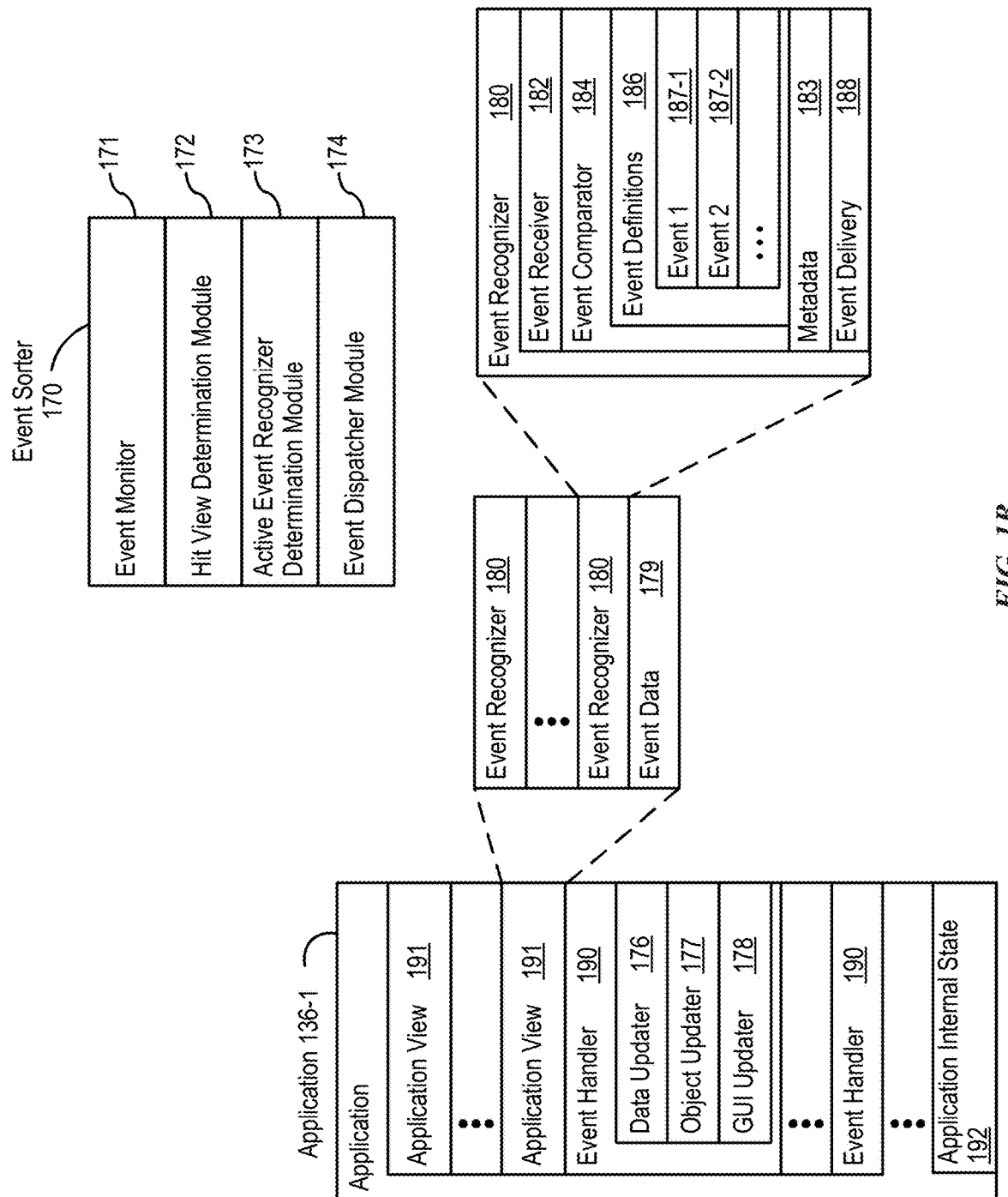
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
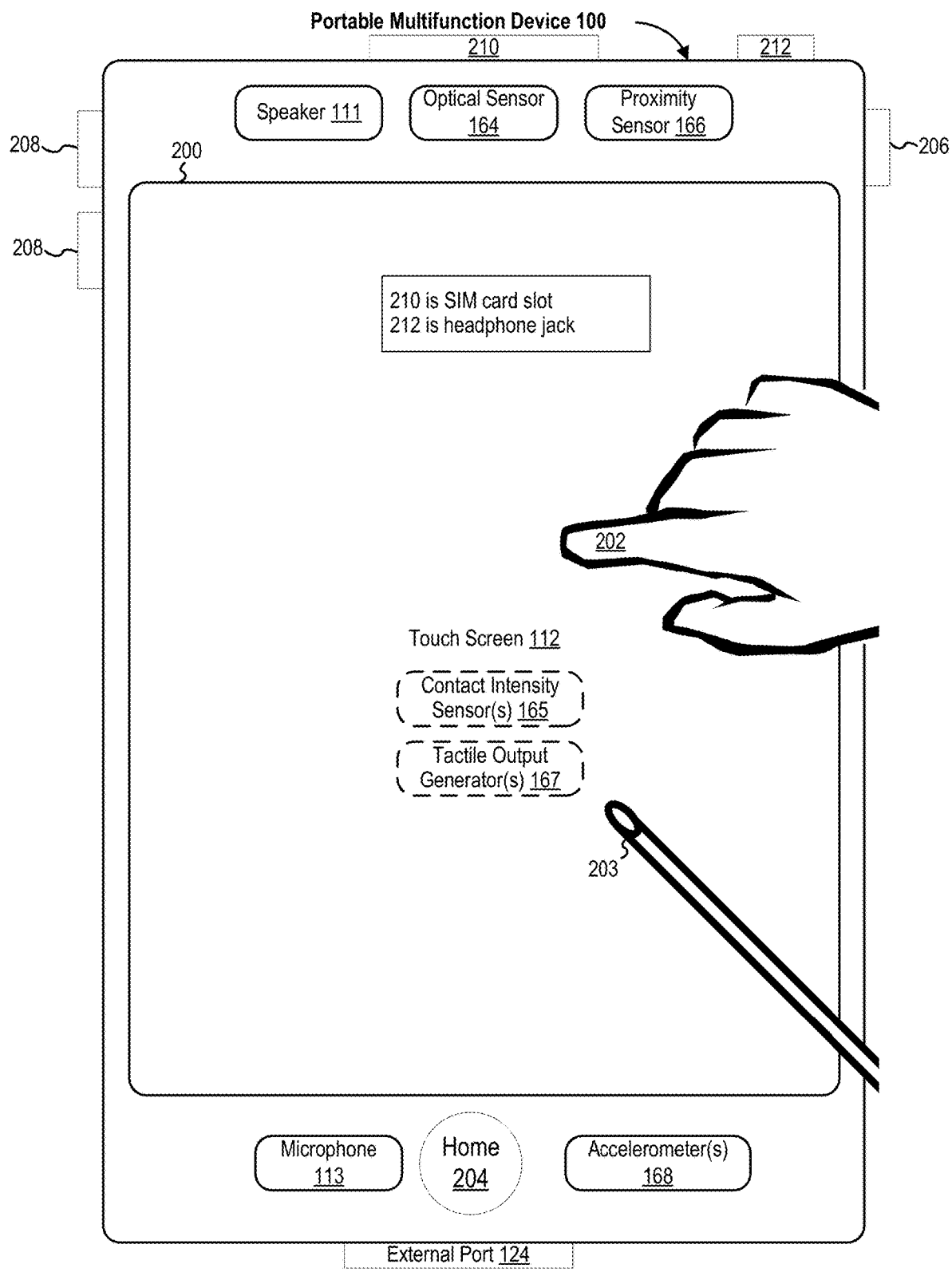
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
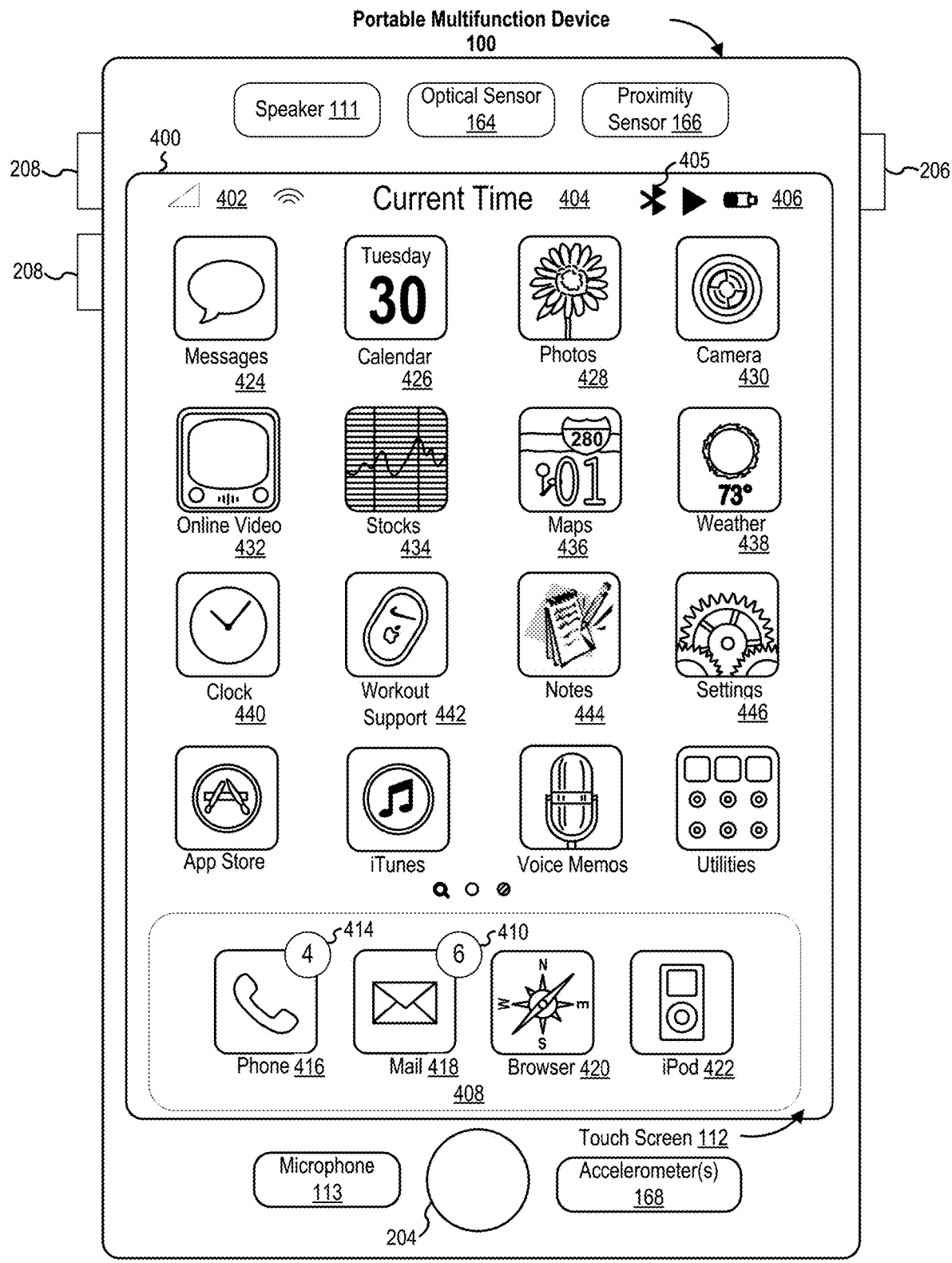
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
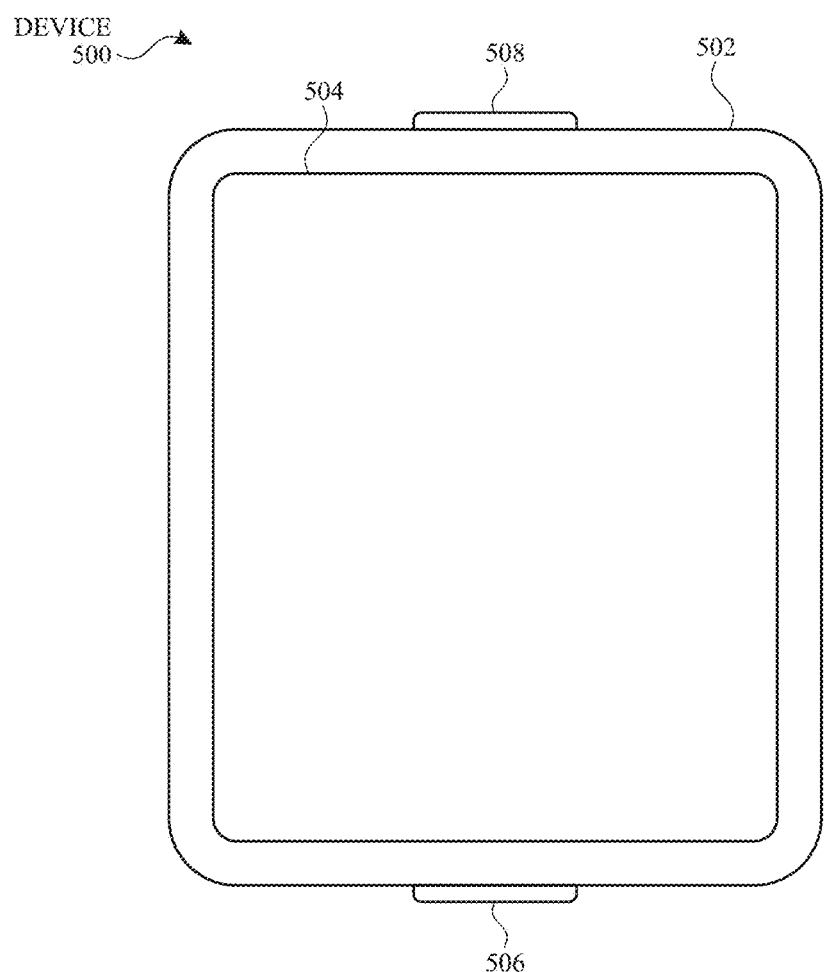
FIG. 5A illustrates a personal electronic device in accordance with some embodiments.
Figure 6A:
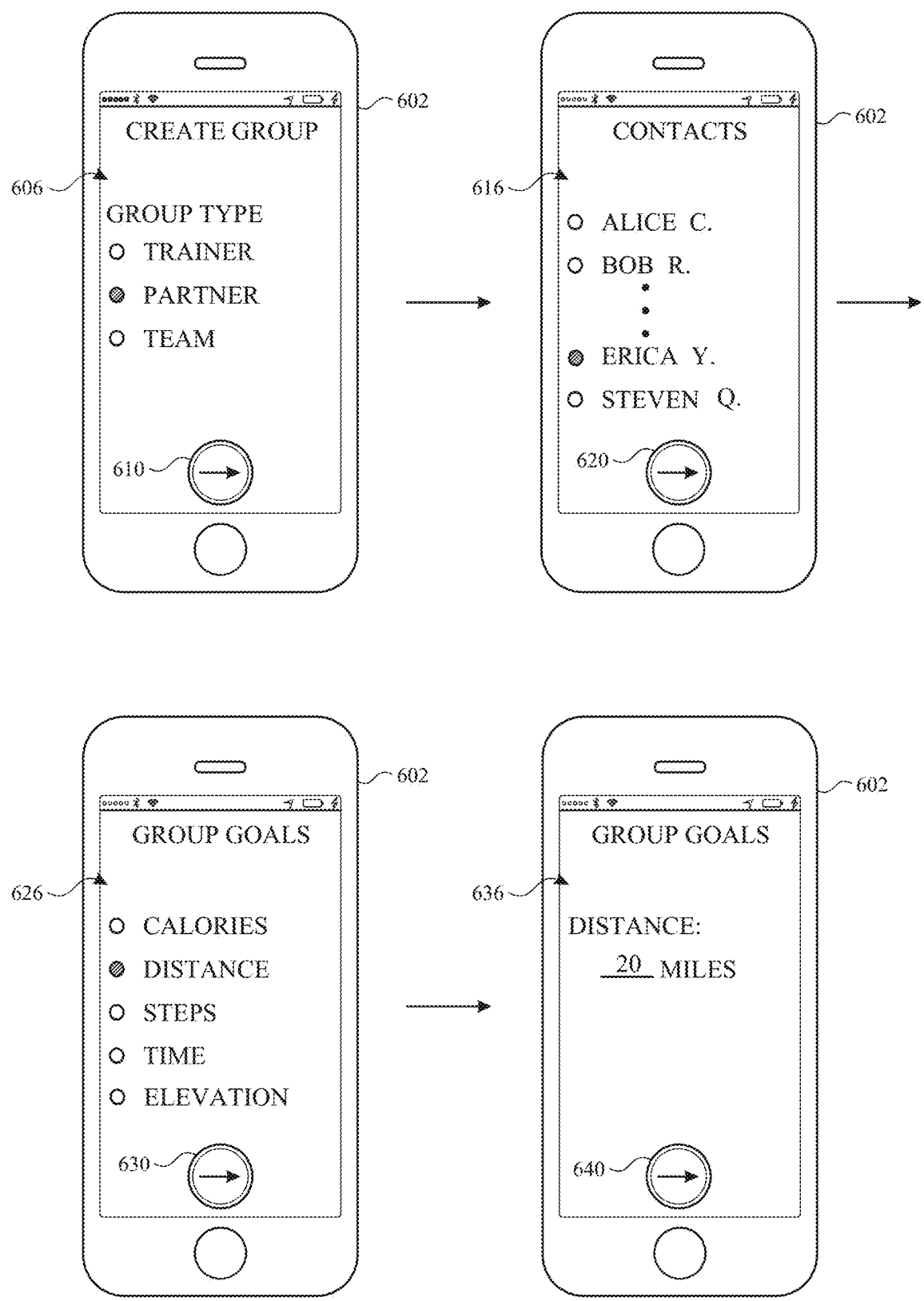
FIGS. 6A-6B illustrate exemplary user interfaces.
Figure 6B:
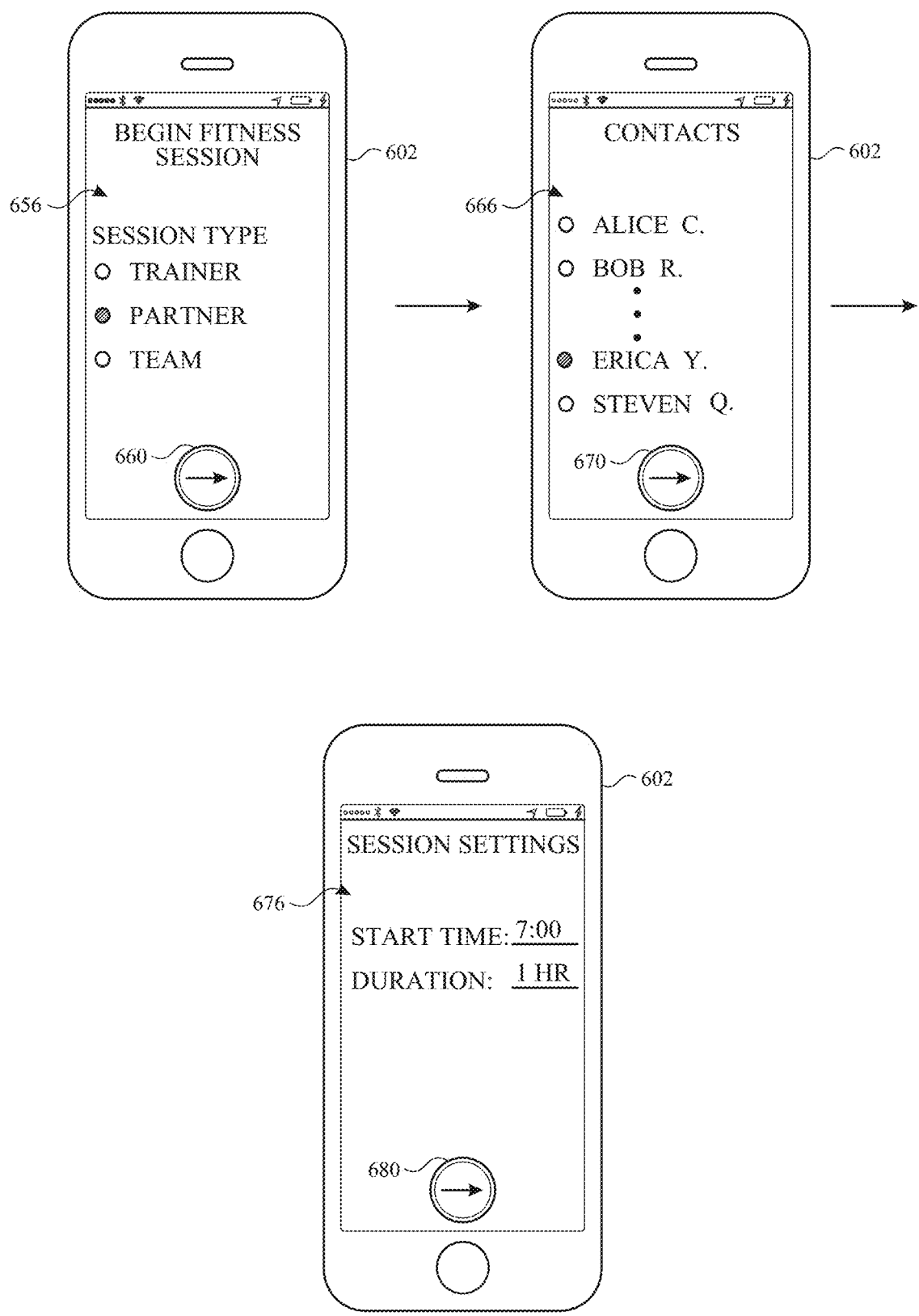

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
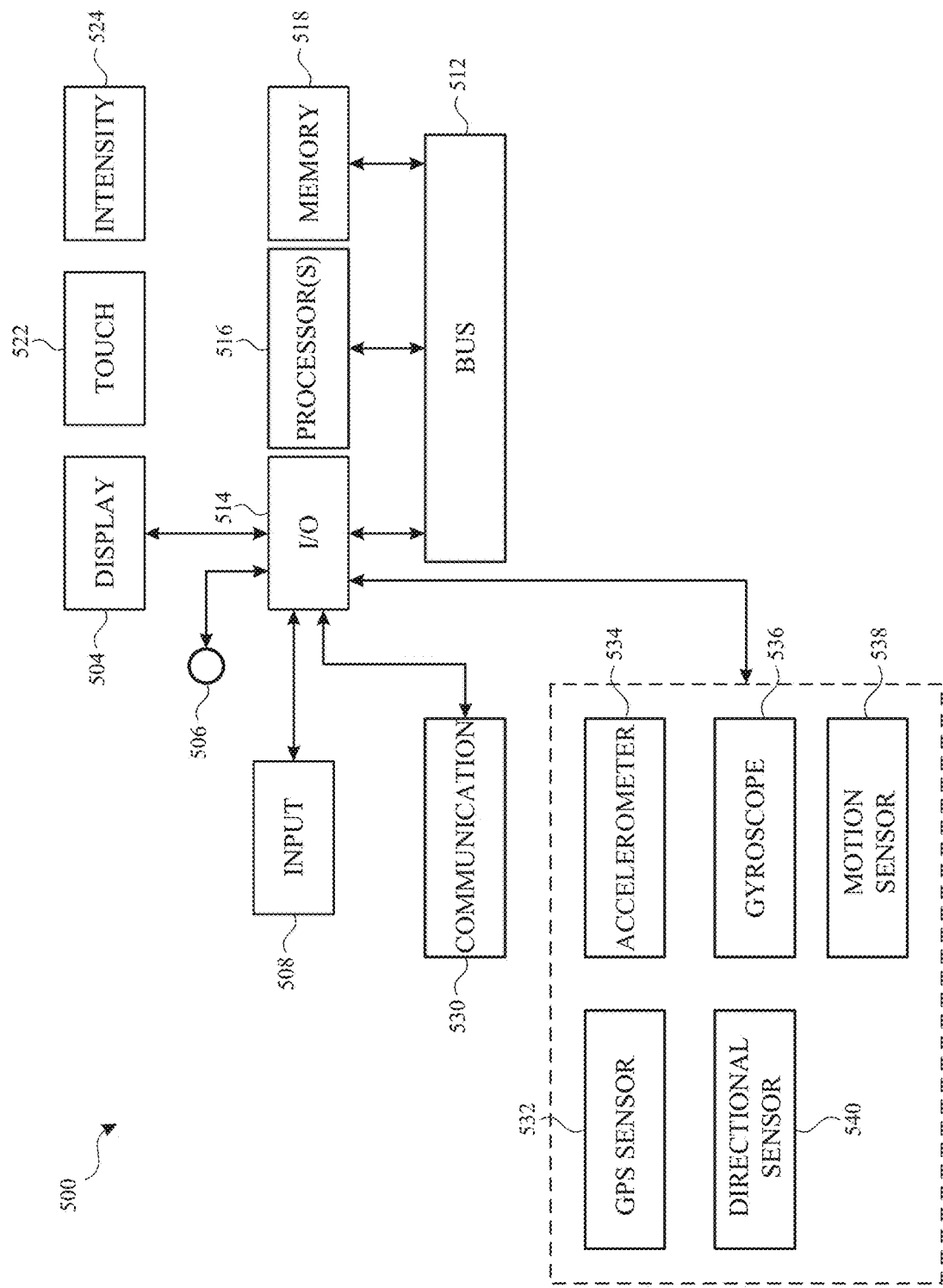
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can be a non-transitory computer-readable storage medium, for storing computer-executable instructions, which, when executed by one or more computer processors 516, for example, can cause the computer processors to perform the techniques described below, including processes 900-1100 (FIGS. 9A-11). The computer-executable instructions can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A-B, 3, and 5A-B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

FIGS. 6A-6B illustrate exemplary user interfaces in accordance with some embodiments. The user interfaces in these figures are used to illustrate the processes described below, including the processes in FIGS. 9A-9C and 11, respectively.

FIG. 6A illustrates exemplary user interfaces of electronic device 602 for creating a fitness group. Electronic device 602 is device 100 (e.g., FIG. 4A) in some embodiments. As shown, electronic device 602 can optionally display user interface screen 606. User interface screen 606, in some embodiments, has icons for selecting a group type of a plurality of group types (e.g., fitness group types). In response to a user group type selection input (e.g., touch) of one or more group types, a selection indicator can optionally indicate selection of the group type(s), as illustrated with respect to the "PARTNER" group type in FIG. 6A. In some examples, "TRAINER" and "TEAM" group types (described in more detail below) can additionally or alternatively be selected by a user. The user group type selection input can optionally be received by a user interface, such as a touch-sensitive display of the device 602. User interface screen 606 can optionally include an affordance 610. When selected, affordance 610 can optionally confirm selection of the one or more group types.

Selection of the affordance 610 can optionally further cause exemplary user interface screen 616 to be displayed. User interface screen 616 has icons for selecting one or more of a plurality of user contacts that, in some instances, can optionally be contacts designated as favorite contacts by the user. Additionally or alternatively, contacts displayed in the user interface screen 616 can optionally be contacts associated with a predetermined electronic device type (e.g., wearable electronic device, such as device 500 of FIG. 5A). In response to a member selection input (e.g., touch) of one or more contacts listed in the user interface screen 616, a selection indicator can optionally indicate selection of the contact(s), as illustrated with respect to the contact "ERICA Y." in FIG. 6B. Any number of contacts can optionally be selected by a user. Contacts selected in this manner can optionally be selected as group members for a fitness group, as described in further detail below. User interface screen 616 can optionally include an affordance 620. When selected, affordance 620 can optionally confirm selection of the one or more members.

Selection of the affordance 620 can optionally further cause exemplary user interface screen 626 to be displayed. User interface screen 626 has icons for selecting one or more of a plurality of group goal types that can optionally include, but are not limited to "CALORIES", "DISTANCE", "STEPS", "TIME", and "ELEVATION". In response to a group goal type selection input (e.g., touch) of one or more group goal types listed in the user interface screen 626, a selection indicator can optionally indicate selection of the group goal type(s), as illustrated with respect to the group goal type "DISTANCE." Group goal types selected in this manner can optionally be associated with a fitness group, as described in further detail below. User interface screen 626 can optionally include an accordance 630, that when selected, can optionally confirm selection of the one or more group goal types.

Selection of the affordance 630 can optionally further cause exemplary user interface screen 636 to be displayed. User interface screen 636 has one or more fields for entering target values for each goal type selected using the user interface screen 626. In the illustrated example, a target value of 20 miles can optionally be entered as a distance goal for a fitness group. User interface screen 636 can optionally include an accordance 640 that, when selected, can optionally confirm selection of the one or more target values entered for one or more of the previously selected goal type(s).

In response to selection of the affordance 640, fitness related notification receipt parameters and fitness related notification transmit parameters can optionally be configured for each group member. Fitness related notification receipt parameters and fitness related notification transmit parameters can optionally specify the manner in which notifications are received by and transmitted from group members of a fitness group, respectively. For example, fitness related notification receipt parameters can optionally specify the frequency notifications are received by (e.g., provided to) each respective member of the fitness group and fitness related notification transmit parameters can optionally specify the frequency notifications are transmitted by each respective member of the fitness group. Notifications can optionally be provided on a daily, weekly, and/or monthly basis, for instance, and/or can optionally be provided in response to one or more events, examples of which are described below.

Figure 7A:
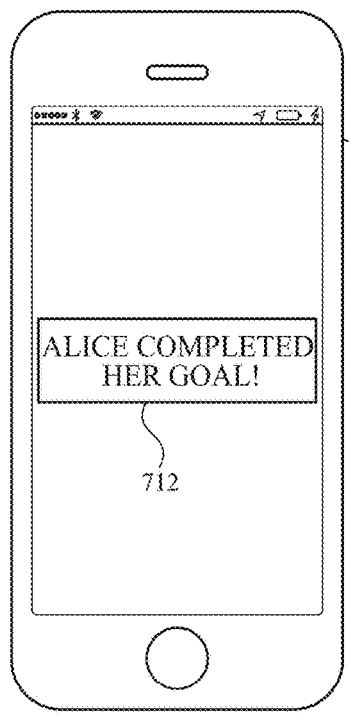
FIGS. 7A-7F illustrate exemplary user interfaces.
Figure 7B:
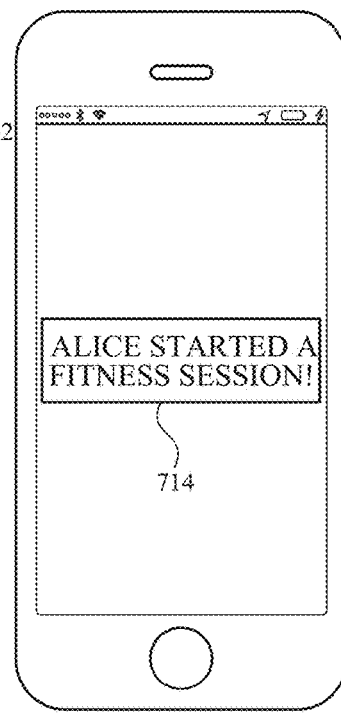
Figure 7C:
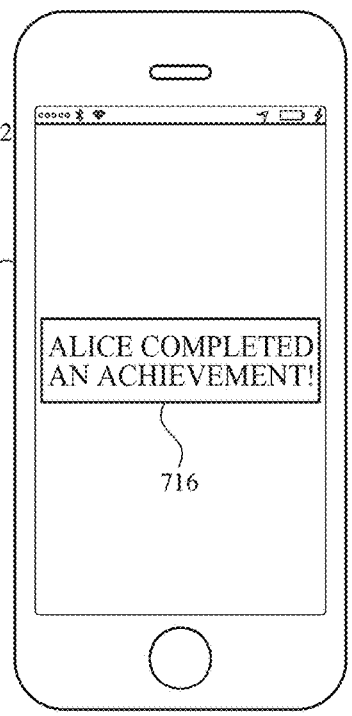
Figure 7D:
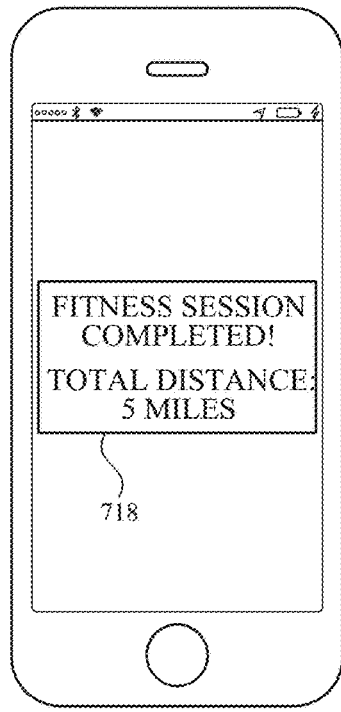
Figure 7E:
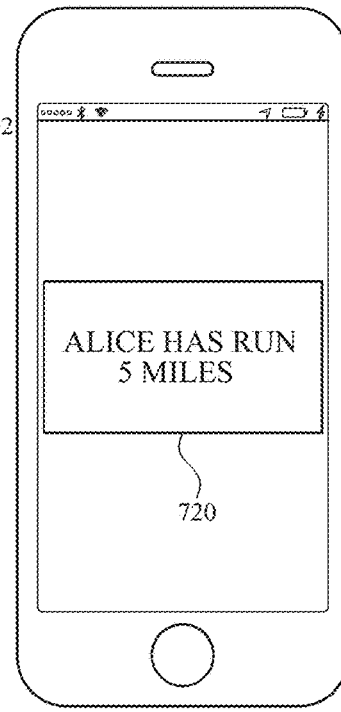
Figure 7F:
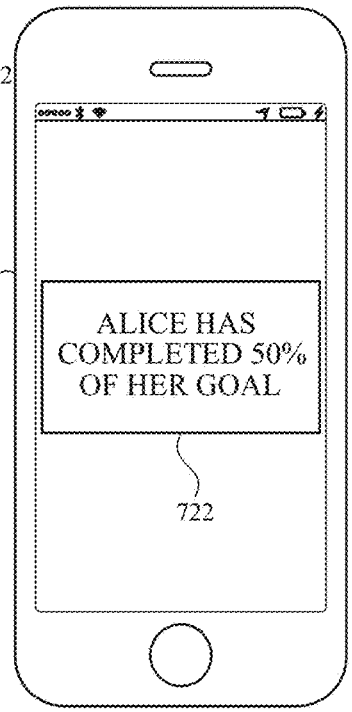
Figure 12:
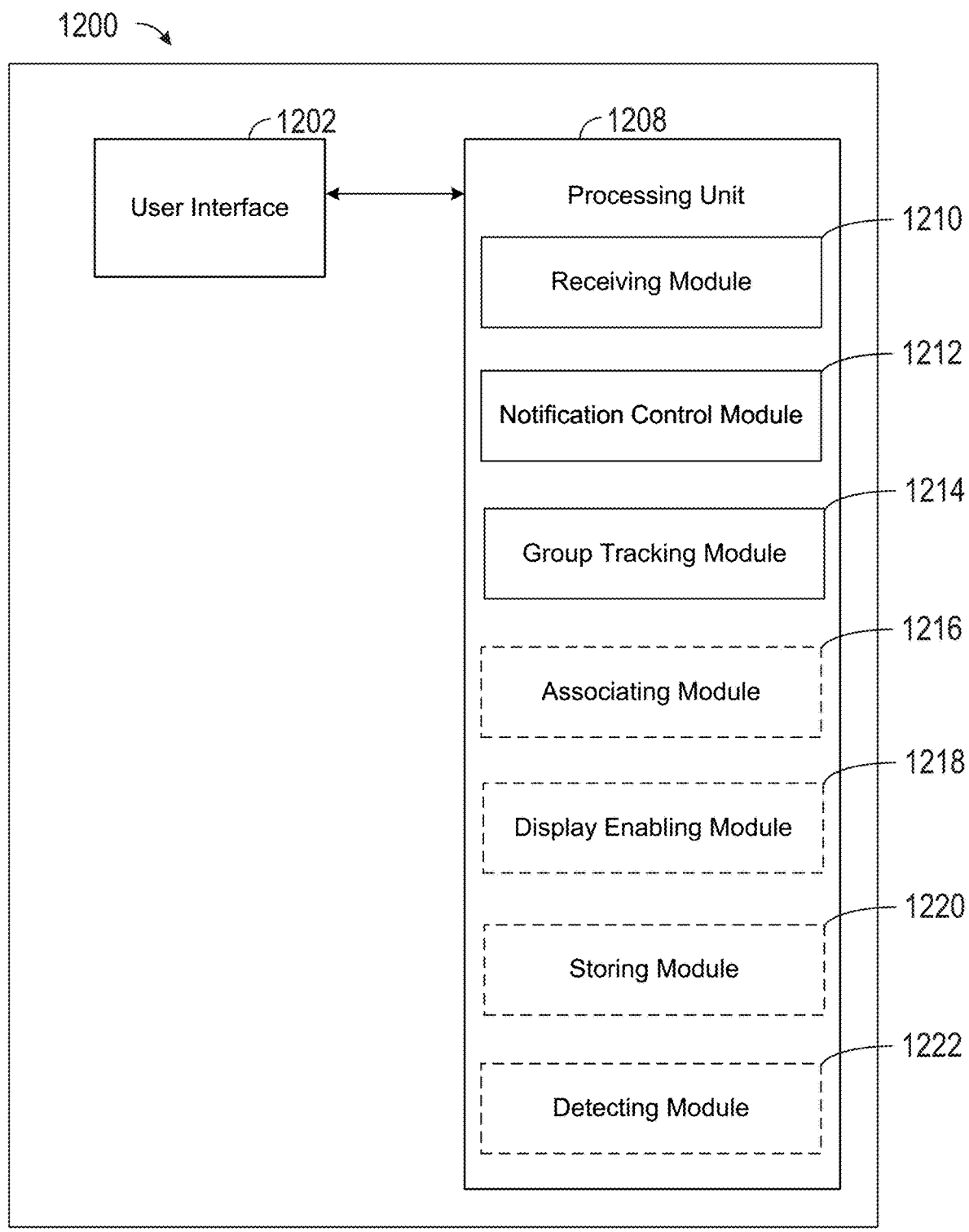
FIG. 12 illustrates a functional block diagram of an electronic device in accordance with some embodiments.

Fitness related notification receipt parameters and fitness related notification transmit parameters can optionally further specify one or more information types included in notifications received by and transmitted from each respective member of the fitness group. Notification information types can optionally include goal completion information type, fitness session information type, achievement (e.g., challenge) completion information type, or a combination thereof. For example, notifications can optionally include information specifying whether one or more group members has completed a goal (e.g., notification 712 of FIG. 7A), whether a group goal has been completed, whether one or more group members has initiated a fitness session (e.g., notification 714 of FIG. 7B), whether one or more group members has completed an achievement (e.g., notification 716 of FIG. 7C), and/or whether one or more members has completed a fitness session (e.g., notifications 718 of FIG. 7D). In some examples, notifications can optionally further specify information regarding types of group member activity (e.g., running, biking, or yoga), progress of a user in completing a goal as a numerical value (e.g., notification 720 of FIG. 7E) or as a percentage (e.g., notification 722 of FIG. 7F), and/or progress of a group in completing a goal as a numerical value or percentage. In some examples, the information types provided to group members can optionally be based on a selected group type and/or the number of members included in a group. Optionally, fitness related notification receipt parameters can optionally be configured using a notification control module, such as the notification control module 1212 (FIG. 12).

Once fitness related notification receipt and transmit parameters have been configured, a group having the selected group type, selected one or more group members, fitness related notification receipt parameters, and fitness related notification transmit parameters can optionally be created. Generally, the group can optionally allow one or more of the selected group members to monitor physical activity of the group and/or one more individual group members. The manner and specificity to which each of the group members can optionally monitor physical activity can optionally be based on the selected group type and/or fitness related notification receipt parameters and fitness related notification transmit parameters.

As described, in some examples, a fitness group can optionally be associated with one or more group goals and a numerical value can optionally be specified for the group value. In some examples, a respective portion of the goal can optionally be assigned to each group member such that each group member can optionally strive to complete a respective portion of the goal. In some examples, each member can optionally be responsible for achieving a same amount of physical activity. In other examples, apportioned amounts of physical activity can optionally vary between two or more group members. Further, in some examples, a type of activity can optionally vary between group members. In some embodiments, group goals are fitness-related goals that are evaluated and met through the activity of the group. In some embodiments, for example, a group goal may require that at least 50%, 75%, or 100% of the members of the group achieve the specified goal (e.g., walking/running 20 or more miles).

While description has been made herein with respect to choosing one or more group goal types, in some examples, goals can optionally be selected for each individual member of a group. By way of example, user interface screens, such as the user interface screens 626 and 636, can optionally iteratively be used to select a goal and associated target value for each group member. In such instances, a group progress can optionally be represented as an average (e.g., a weighted average) of individual group member progress. For example, if the individual progress of three group members is 25%, 50%, and 75%, respectively, the group goal will be considered to be 50% complete.

As described, selectable group types can optionally include trainer, partner, and team group types, and notification receipt and transmit parameters can optionally be configured based on the selected group type. In a trainer group type, a particular group member (e.g., group creator) receives from all other group members data and notifications specifying goals, achievements, and all metrics for the other members, and the other members of the group do not receive data or notifications. Accordingly, communication between group members in a trainer type group can optionally be asymmetric or unidirectional. In a partner group type, each member provides data and notifications to and receives data and notifications from other group members. Accordingly, communication between group members in a partner group type is symmetrical or bidirectional. Data and notifications exchanged between members can optionally be unlimited such that each group member can view all information of other members or can optionally be limited such that each member can view only goals and achievements of members, but no numerical values, as described in further detail below. In some examples, partner type groups can optionally be limited to a specific number of members (e.g., 5 members). In a team group type, communication can optionally depend on the number of members in the group. If the number of members is below a threshold (e.g., 5 members), each member provides data and notifications to and receives data and notifications from other group members such that each member can view goals and achievements of the group, but not for specific members of the group. If the number of members exceeds the threshold, members can optionally receive notifications regarding a featured group member. A different group member can optionally, for instance, be featured on a periodic (e.g., daily) basis. Group members can optionally, for instance, view progress and/or goals of featured members.

FIG. 6B illustrates exemplary user interfaces for creating a fitness session. Electronic device 602 is device 100 (e.g., FIG. 4A) in some embodiments. As shown, electronic device 602 can optionally display user interface screen 656. User interface screen 656, in some embodiments, has icons for selecting a session type of a plurality of session types (e.g., fitness session types). In response to a user session type selection input (e.g., touch) of one or more session types, a selection indicator can optionally indicate selection of the session type(s), as illustrated with respect to the "PARTNER" session type in FIG. 6B. In some examples, "TRAINER" and "TEAM" session types can optionally additionally or alternatively be selected by a user. The user session type selection input can optionally be received by a user interface, such as a touch-sensitive display of the device 602. User interface screen 656 can optionally include an affordance 660. When selected, affordance 660 can optionally confirm selection of the one or more session types.

Selection of the affordance 660 can optionally further cause exemplary user interface screen 666 to be displayed. User interface screen 666 has icons for selecting one or more of a plurality of user contacts that in some instances can optionally be contacts designated as favorite contacts by the user. Additionally or alternatively, contacts displayed in the user interface screen 666 can optionally be contacts associated with a predetermined electronic device type (e.g., wearable electronic device). In response to a member selection input (e.g., touch) of one or more contacts listed in the user interface screen 666, a selection indicator can optionally indicate selection of the contact(s), as illustrated with respect to the contact "ERICA Y." in FIG. 6B. Any number of contacts can optionally be selected by a user. Contacts selected in this manner can optionally be selected as members for participating in the fitness session, as described in further detail below. User interface screen 666 can optionally include an affordance 670. When selected, affordance 670 can optionally confirm selection of the one or more members.

Selection of the affordance 670 can optionally further cause exemplary user interface screen 676 to be displayed. User interface screen 676 has one or more fields for entering values for each of a start time and duration of the fitness session. Optionally, the user interface screen 676 further includes a field for entering a start date value for the fitness session. In the illustrated example, the start time can optionally be "7:00" and the duration of the fitness session can optionally be 1 hour. User interface screen 676 can optionally include an accordance 680 that when selected can optionally confirm selection of the values entered for the fitness session.

In response to selection of the affordance 680, fitness related notification receipt parameters and fitness related notification transmit parameters can optionally be configured for each session member. As described, fitness related notification receipt parameters and fitness related notification transmit parameters can optionally specify the manner (e.g., frequency) in which notifications are received by and transmitted from group members of a fitness group, respectively. Selectable session types can optionally include trainer, partner, and team session types, and notification receipt and transmit parameters can optionally be configured based on the selected session type. In some examples, notifications exchanged from members can optionally only be notifications related to the fitness session, such as user initiation of the fitness session, completion of the fitness session, and progress during the fitness session. In some examples, fitness sessions may be renewed. That is, a user may initiate a fitness session having one or more of the same characteristics of a fitness session initiated by the user or another user.

FIGS. 8A-8F illustrate exemplary user interfaces, in accordance with some embodiments. The user interfaces in these figures are used to illustrate the processes described below, including the process in FIGS. 10A-10B.

Figure 8A:
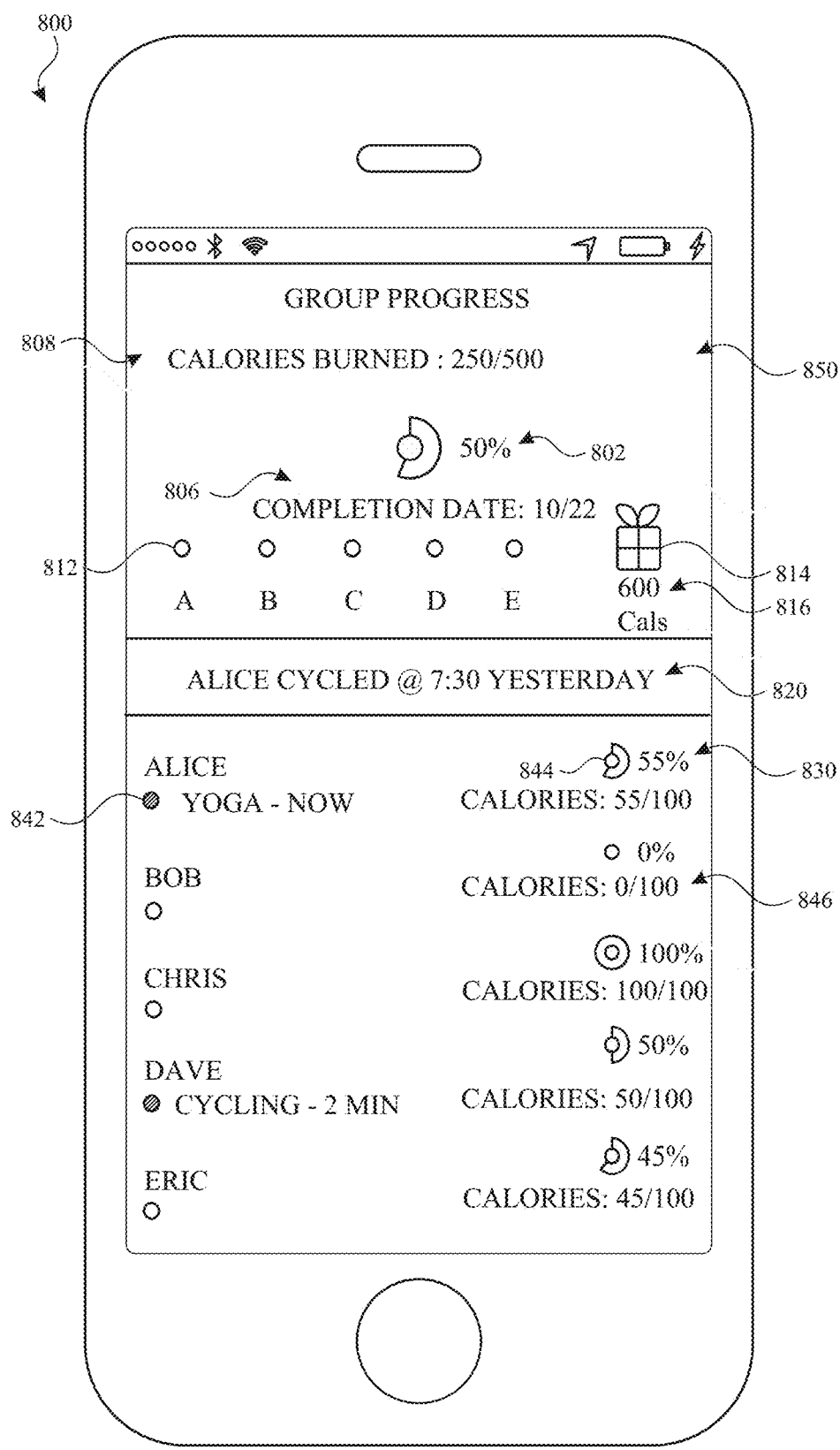
FIGS. 8A-8F illustrate exemplary user interfaces.
Figure 9C:
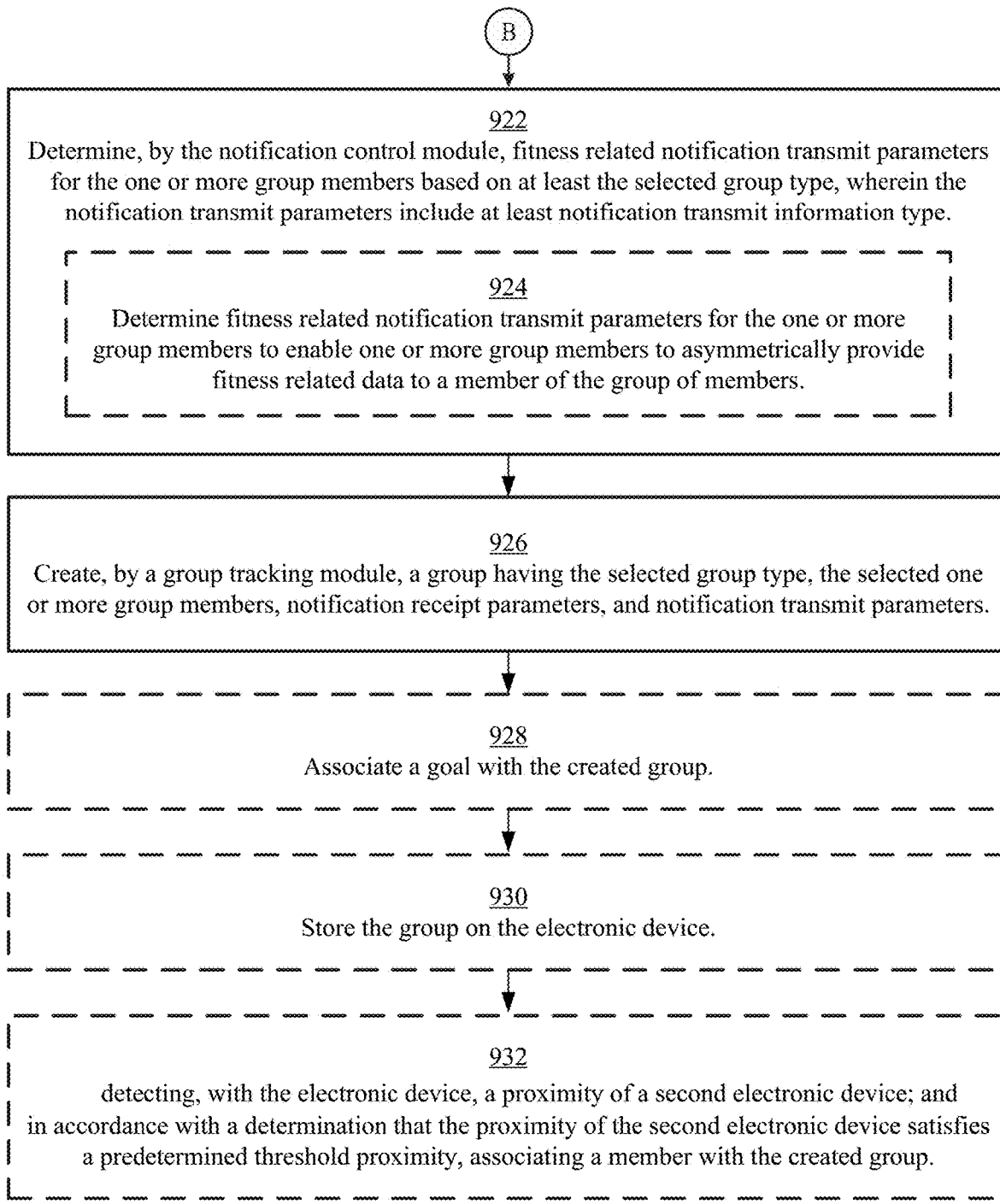

FIG. 8A illustrates an exemplary user interface for displaying fitness progress for a trainer type group. Electronic device 800 is device 500 (FIG. 5A) in some embodiments. As shown, electronic device 800 can optionally display user interface screen 850. User interface screen 850, in some embodiments, includes a group goal progress indicator 802 that can optionally be indicative of the aggregate progress of a group of members in reaching each of their individual fitness goals. As illustrated, the group goal progress indicator 802 can optionally indicate group progress graphically and/or numerically. In some examples, the electronic device 800 can optionally receive data indicative of group progress from one or more other devices associated with other members of a group, respectively.

User interface screen 850 includes a completion indicator 806 that indicates a recommended (or required) completion date and/or completion time of the group goal. In some examples, the group can optionally be closed (e.g., deleted) upon reaching the completion date and/or time. In some examples, a fitness group may further be renewed. That is, a user may initiate a fitness group having one or more of the same characteristics of a fitness group initiated by the user or another user. User interface screen 850 further includes a group metric indicator 808 that, like the group goal progress indicator 802, can optionally be indicative of the aggregate progress of the group of members. The group metric indicator 808 can optionally specify a numerical value indicative progress of the group, such as a total of number of calories burned as in the illustrated example.

In some examples, users can optionally be incentivized to perform physical activity using challenges. For example, the user interface screen 850 includes user indicators 812, a gift affordance 814, and a gift target indicator 816. Each member indicator 812 can optionally correspond to a respective group member and specify whether a particular member has achieved a target specified by the target indicator 816. In the event that a group member achieves the target, for instance, during a specified period of time, the member can optionally be rewarded with a gift. Rewards can optionally include, for instance, complementary access to digital media. In some examples, the gift affordance 814, when selected, can optionally cause a description of the gift to be displayed to the user.

Challenges can optionally be employed at both group and member levels. For example, a challenge can optionally be specified for a group and the first group member to achieve a gift target can optionally receive the corresponding gift. In this manner, group members can optionally compete for a same gift. In other examples, a challenge can optionally be specified for a particular group member such that only the specified group member can optionally achieve the gift target.

User interface screen 850 further includes an activity log 820. The activity log 820 can optionally describe previous physical activity of group members, including but not limited to when and where the physical activity was performed, what physical activity was performed, and progress made during the physical activity (e.g., number of calories burned, percent of individual goal accomplished). Previous activity can optionally be shown for any number of group members and for any number of instances in which physical activity was performed.

User interface screen 850 includes a member activity portion 830 specifying the physical activity of one or more group members of a group. Because the user interface screen 850 can optionally be a user interface screen for a trainer type group, the member activity portion 830 can optionally include, for each member, an activity indicator 842, an individual goal progress indicator 844, and an individual metric indicator 846. Each activity indicator 842 can optionally indicate whether a respective group member is currently performing physical activity or has recently performed physical activity. Each activity indicator 842 further can optionally specify the type of activity performed. Each individual goal progress indicator 844 can optionally be indicative of the progress of a respective group member in reaching an individual fitness goal. As illustrated, each individual goal progress indicator 844 can optionally indicate individual progress graphically and/or numerically. Each individual metric indicator 846 can optionally specify a numerical value indicative progress of a respective group member. In some examples, members and corresponding fitness information can optionally be reordered within the member activity portion 830 as desired.

In the example illustrated in FIG. 8A, goals of the respective group members are shown as having a same metric (e.g., calories). It will be appreciated, however, that in some examples, goals of different members can optionally have different metrics. By way of example, a goal of a first group member can optionally have a calorie metric, a goal of a second member can optionally have a distance metric, and a goal of a third group member can optionally have a time metric.

Figure 8B:
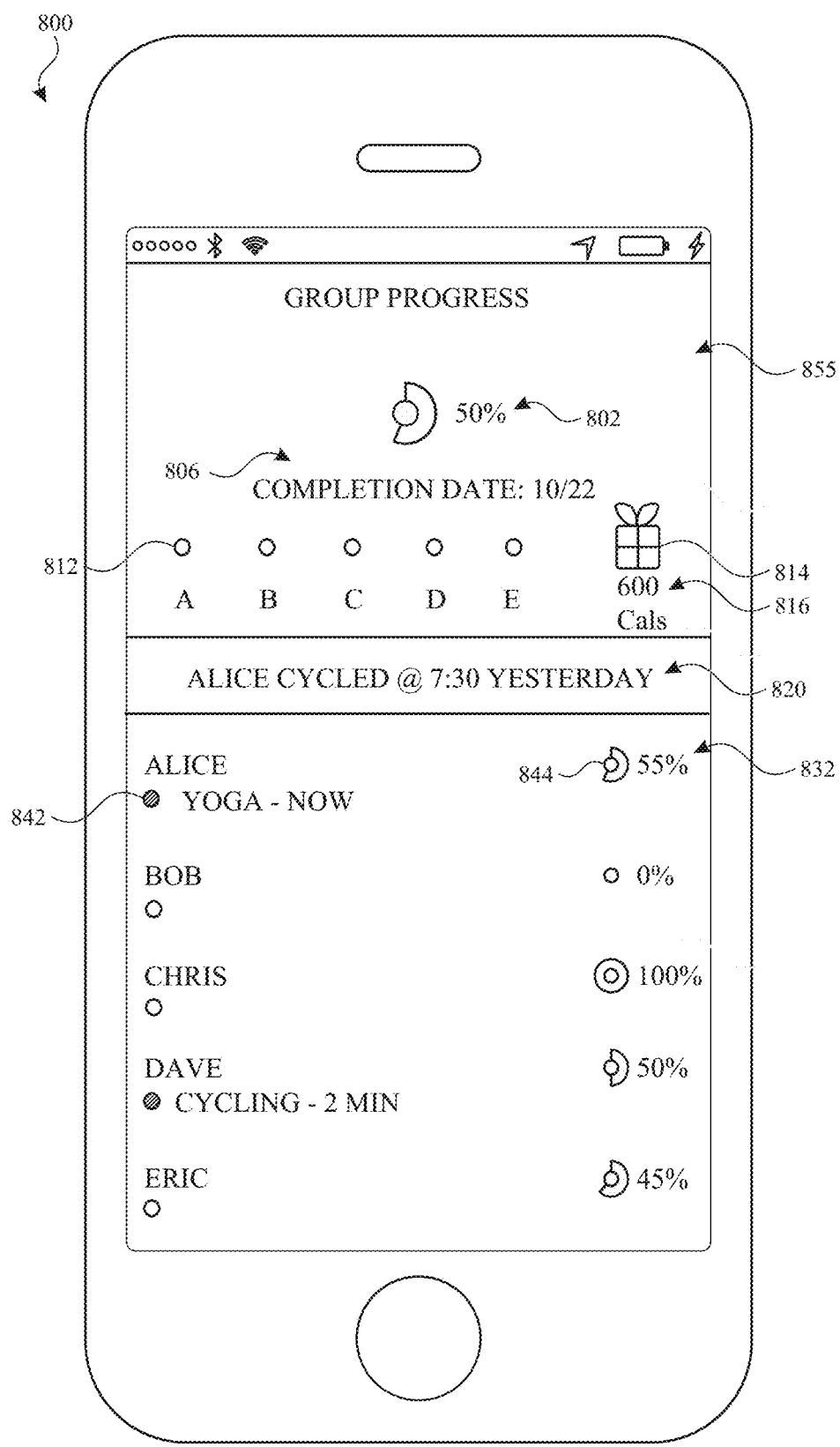
Figure 8C:
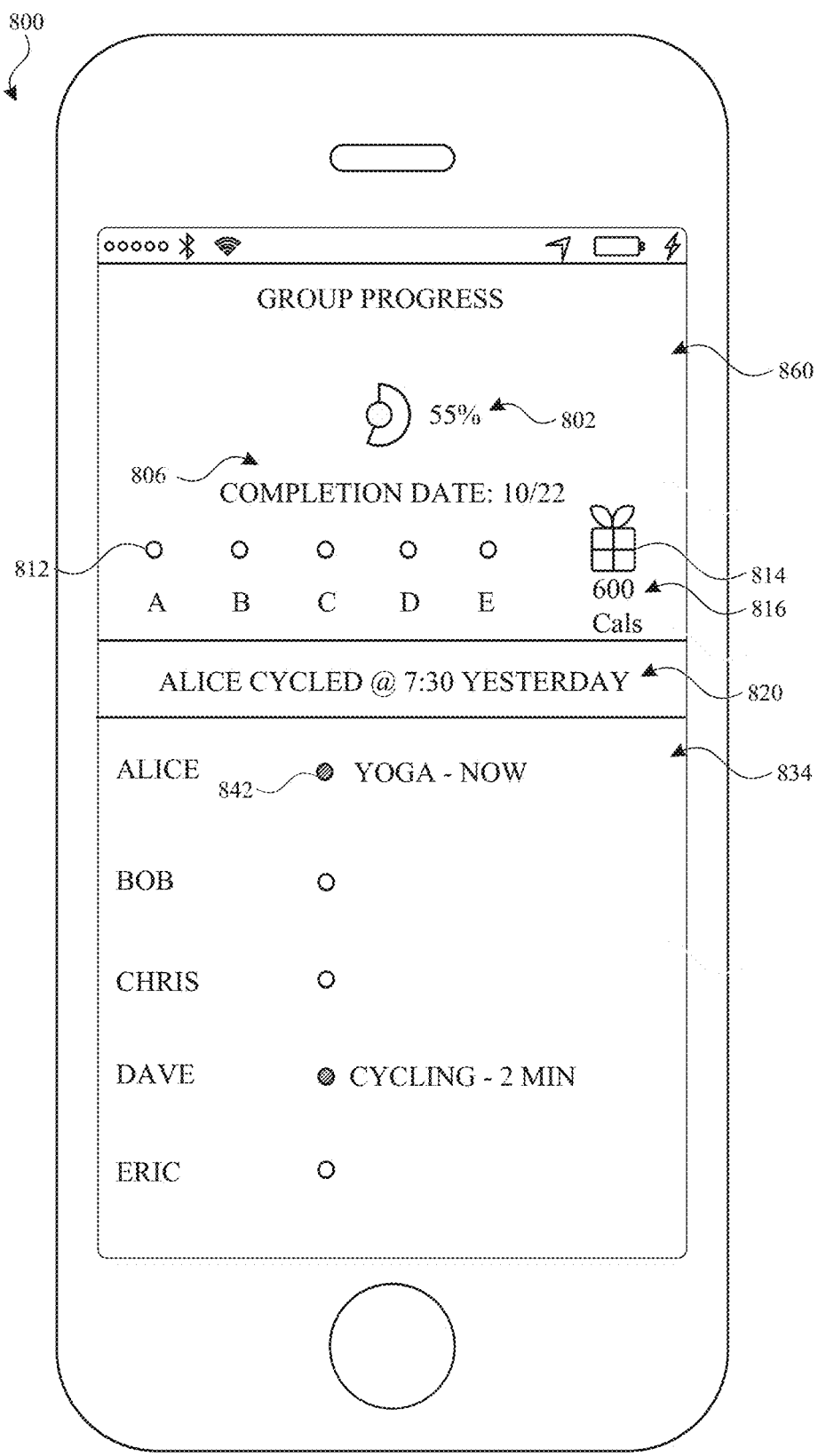

FIGS. 8B and 8C illustrate exemplary user interfaces for displaying fitness progress. Many elements illustrated in FIGS. 8B and 8C are the same or substantially the same as those described with respect to FIG. 8A. Therefore, in the interest of brevity, an explanation of these components will not be repeated, and the same reference numerals will be used in FIGS. 8B-C.

The user interface screen 855 of FIG. 8B can optionally be a user interface screen for a partner type group. Accordingly, in contrast to the user interface screen 850 of FIG. 8A, the user interface screen 855 can optionally omit numerical values such that group members can optionally view goal progress of the group and other members represented as a percentage.

The user interface screen 860 of FIG. 8C can optionally be a user interface screen for a team type group. Accordingly, in contrast to each of the user interface screens 850 and 855, the user interface screen 860 can optionally omit individual group member progress such that group members can optionally view goal progress of the group represented as a percentage.

Figure 8D:
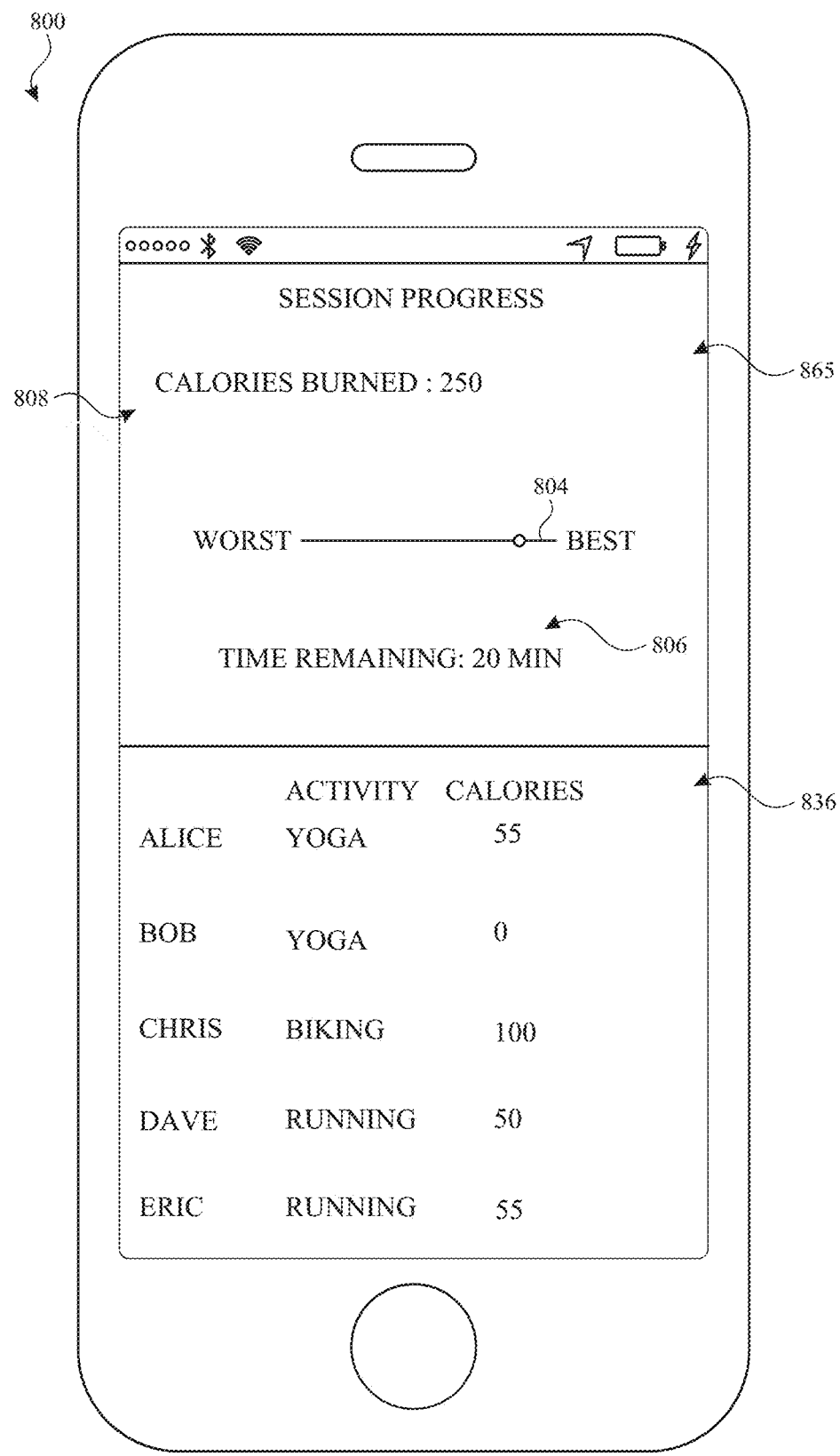

FIG. 8D illustrates an exemplary user interface for displaying fitness progress for a trainer type session. Electronic device 800 is device 500 (FIG. 5A) in some embodiments. As shown, electronic device 800 can optionally display user interface screen 865. User interface screen 865, in some embodiments, includes a group metric indicator 808 that can optionally be indicative of the aggregate progress of the group of members. The group metric indicator 808 can optionally specify a numerical value indicative progress of the group, such as a total of number of calories burned as in the illustrated example. User interface screen 865 further can optionally include a performance indicator 804 that indicates the relative performance of a group during a session compared to performance in a prior session. By way of example, the performance indicator 804 can optionally indicate the relative rate at which calories are burned in a current fitness session comparison to one or more previous sessions. The user interface screen 865 further can optionally include a remaining time indicator 806. The remaining time indicator can optionally, for instance, indicate the amount of time remaining until the conclusion of a fitness session.

User interface screen 865 includes a member activity portion 836 specifying the physical activity of one or more members of a fitness session. Because the user interface screen 865 can optionally be a user interface screen for a trainer type session, the member activity portion 836 can optionally specify, for each member, a type of activity and individual progress associated with that activity.

In the example illustrated in FIG. 8D, progress is measured using a same metric (e.g., calories) for each of the session members. It will be appreciated, however, that in some examples, progress of different members can optionally be measured using different metrics. By way of example, progress of a first member can optionally be measured using a calorie metric, progress of a second member can optionally be measured using a distance metric, and progress of a third member can optionally be measured using a time metric.

Figure 8E:
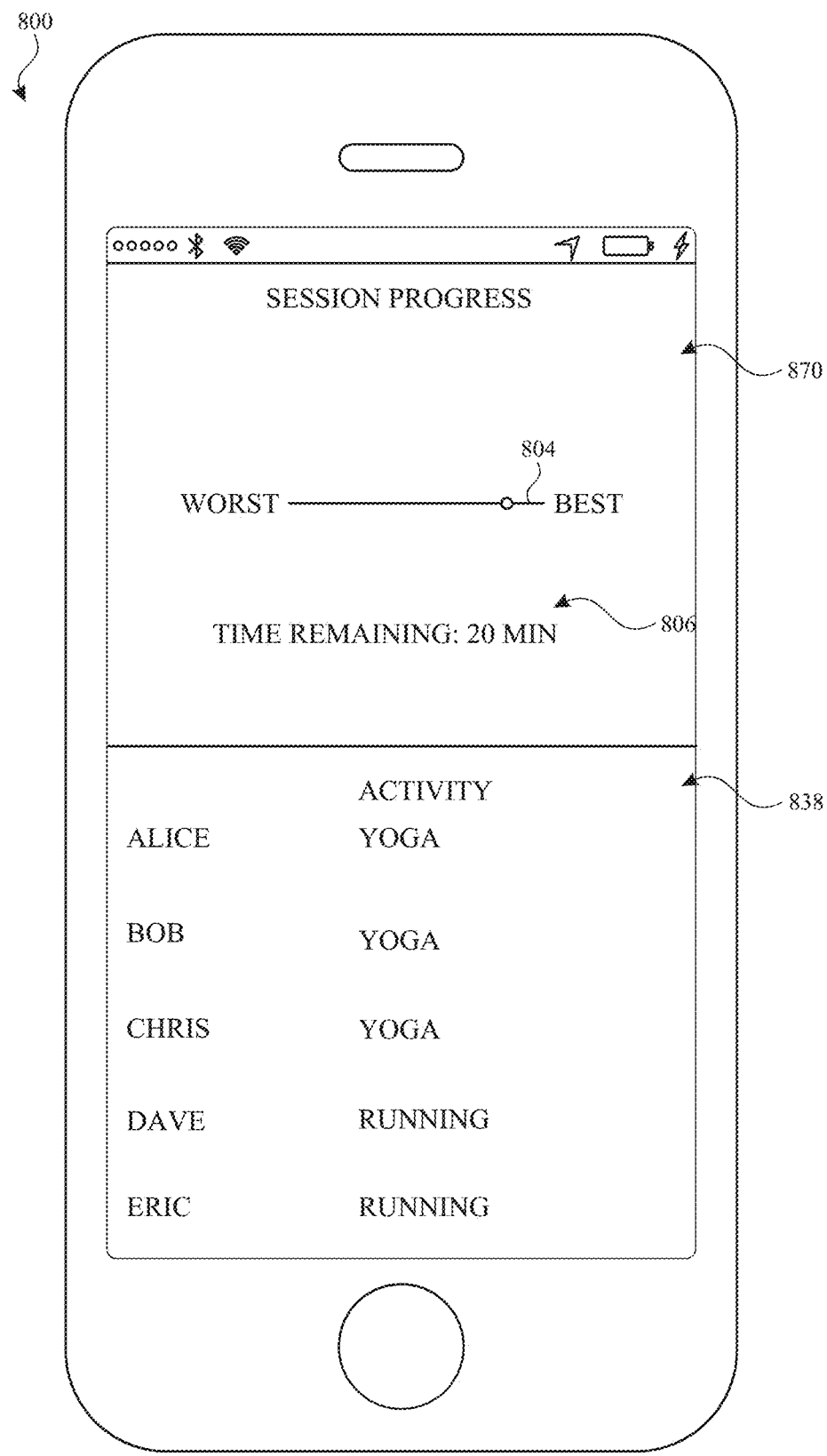
Figure 8F:
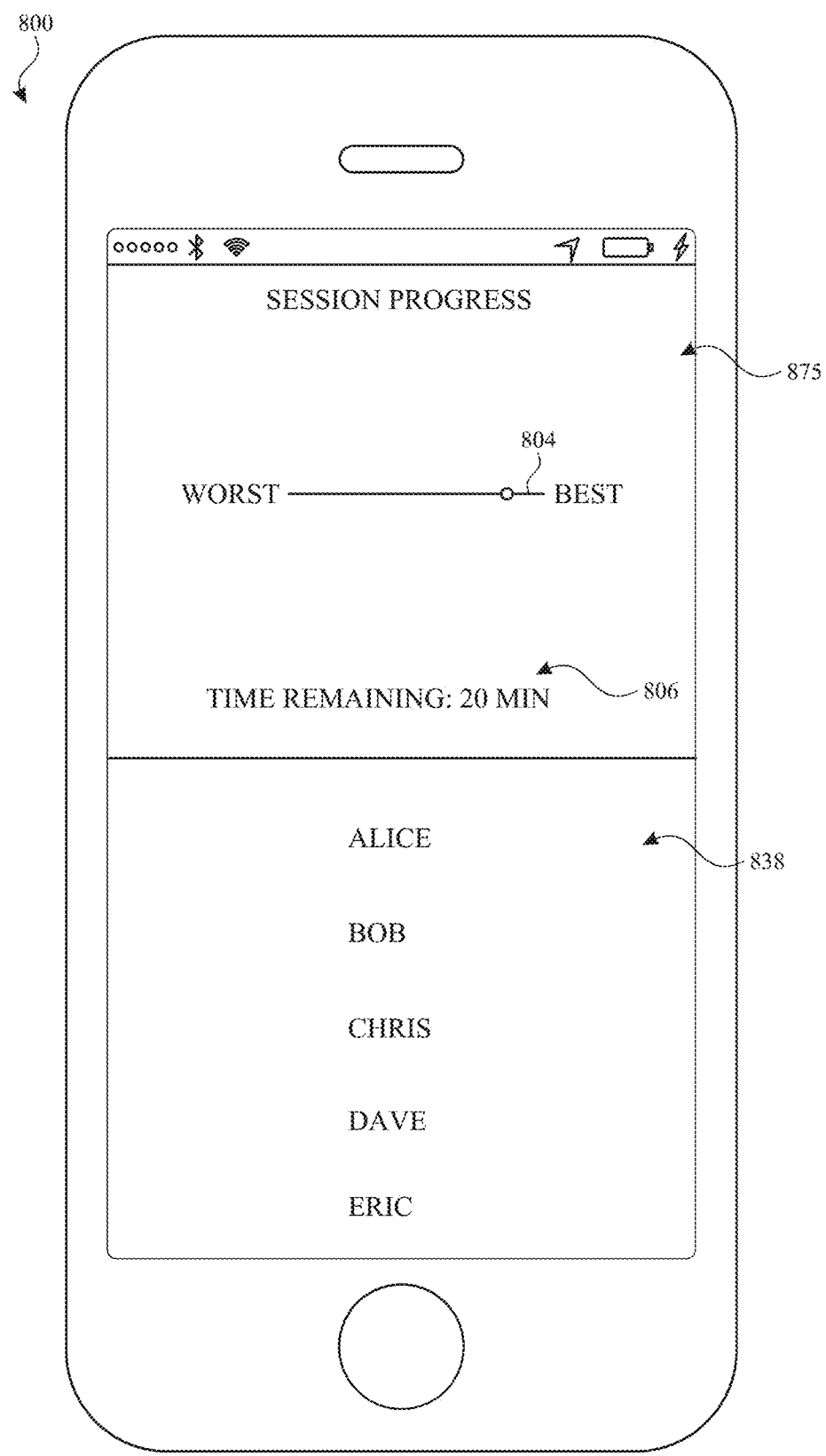

FIGS. 8E and 8F illustrate exemplary user interfaces for displaying fitness progress. Many elements illustrated in FIGS. 8E and 8F are the same or substantially the same as those described with respect to FIG. 8D. Therefore, in the interest of brevity, an explanation of these components will not be repeated, and the same reference numerals will be used in FIGS. 8E-F.

The user interface screen 870 of FIG. 8E can optionally be a user interface screen for a partner type session. Accordingly, in contrast to the user interface screen 865 of FIG. 8D, the user interface screen 870 can optionally omit numerical values such that group members can optionally only view activity type of members during the session.

The user interface screen 875 of FIG. 8F can optionally be a user interface screen for a team type session. Accordingly, in contrast to each of the user interface screens 865 and 870, the user interface screen 875 can optionally omit individual activity type such that group members can optionally only view other members participating in the session.

While description has been made herein with respect to user interface screens directed to fitness groups including particular elements (e.g., group goal progress indicators) and user interface screens directed to fitness session including particular elements (e.g., performance indicators), it will be appreciated that such elements can optionally be included in any user interface screens described herein. For example, user interface 865 of FIG. 8D can optionally include a group goal progress indicator and/or one or more individual goal progress indicators such that group goals and/or individual goals can optionally be specified and tracked during a fitness session.

FIGS. 9A-C illustrate a process 900 for creating a fitness group in accordance with some embodiments. Process 900 is performed at a device (e.g., 100, 300, 500) having a user interface in some examples. Some operations in process 900 are, optionally, combined, and the order of some operations is, optionally, changed, and some operations are, optionally, omitted.

At block 902, a group type selection input of a group type from among a plurality of group types is received by a user interface of an electronic device. For example, a user can optionally select a group type from a list of available group types. Exemplary group types include trainer, partner, and team group types. In a trainer group type, a designated member (e.g., group creator) sees all information of all other members including goals, achievements, and metrics; other members do not receive data from the designated member or other members. Accordingly, data sharing between members can optionally be asymmetric or unidirectional. In a partner group type, each member sees information of other partners. Accordingly, data sharing in a partner group type is symmetrical. Visible information can optionally be unlimited such that each member can see all information of other members or can optionally be limited such that each member can view achievements and goals, but no actual metric. Partner group type can optionally be limited to a specific number of members (e.g., 5 members). In a team group type, configuration can optionally depend on the number of members in the group. If the number of members is below a threshold (e.g., 5 members), each member can view achievements and goals for the group as a whole. Members can optionally be prohibited from viewing information for specific members of the group. If the number of members exceeds the threshold, goals and achievements can optionally be omitted, but a member can optionally be featured to other members of the group. In some examples, for each group type, these settings are merely default settings and settings can optionally be adjusted as desired.

At block 904, a member selection of one or more group members is received by the user interface of the electronic device. In some examples, receiving the member selection input includes displaying a list of contacts on the electronic device. The list of contacts can optionally be displayed on a display (e.g., touch-sensitive display) of the electronic device. A selection of one or more contacts from the displayed list of contacts can optionally be received by the user interface. In some examples, receiving the selection of one or more contacts from the displayed list of contacts includes displaying a list of contacts on the electronic device, where the list provides an indication associating one or more contacts with a predetermined electronic device type (e.g., particular mobile electronic device or wearable electronic device). A selection of one or more contacts associated with the predetermined electronic device type can optionally be received, for instance, by the user interface.

At block 914, fitness related notification receipt parameters for the one or more group members can optionally be determined based on at least the selected group type. Optionally, the determination can optionally be made using a notification control module. In some examples, the notification receipt parameters include at least one notification receipt frequency (e.g., hourly daily, weekly) and at least one notification receipt information type. Notification receipt information types can optionally include goal completed, session initiated, and achievement acquired. For the goal completed type, information regarding the completion of a goal by another member of the group is received. For the session initiated type, information regarding another member of the group initiating a fitness session is received. For the achievement acquired notification, information regarding the completion of an achievement is received.

In some examples, determining fitness related notification receipt parameters for the one or more group members includes determining fitness related notification receipt parameters for the one or more group members to enable a member of the one or more group members to asymmetrically receive fitness related notifications from one or more other group members.

In some examples, determining fitness related notification receipt parameters for the one or more group members includes determining fitness related notification receipt parameters for the one or more group members enabling each group member to symmetrically receive data from one or more other group members.

In some examples, determining fitness related notification receipt parameters for the one or more group members includes determining notification receipt parameters for the one or more group members based on a number of group members.

At block 922, fitness related notification transmit parameters for the one or more group members can optionally be determined based on at least the selected group type. Optionally, the determination can optionally be made using the notification control module. In some examples, the notification transmit parameters include at least one notification transmit information type. In some examples, determining fitness related notification transmit parameters for the one or more group members includes determining fitness related notification transmit parameters for the one or more group members to enable one or more group members to asymmetrically provide fitness related data to a member of the group of members.

At block 926, a group having the selected group type, selected one or more group members, notification receipt parameters, and notification transmit parameters can optionally be created. Optionally, the group can optionally be created with a group tracking module.

In some examples, the created group is associated with a goal. In some examples, the goal can optionally be an aggregate fitness goal for all members of the group. In some examples, one or more group members can optionally be associated with a respective personalized fitness goal.

In some examples, the group is stored on an electronic device.

In some examples, a proximity of a second electronic device is detected and, in accordance with a determination that the proximity of the second electronic device satisfies a predetermined threshold proximity, a member is associated with the created group. In some examples, detecting the proximity of the second electronic device can optionally include detecting physical contact of the electronic device with the second electronic device. In some examples, associating a member with the created group includes adding the member to the group.

Note that details of the processes described above with respect to process 900 (e.g., FIGS. 9A-C) are also applicable in an analogous manner to the processes described below. For example, process 900 optionally includes one or more of the characteristics of the various methods described below with reference to processes 1000 and 1100. For example, after performing creating operation 926, one or more operations of the method 1000 can optionally be employed, such as the receiving operation 1002. In the interest of brevity, these details are not repeated below.

Figure 10B:
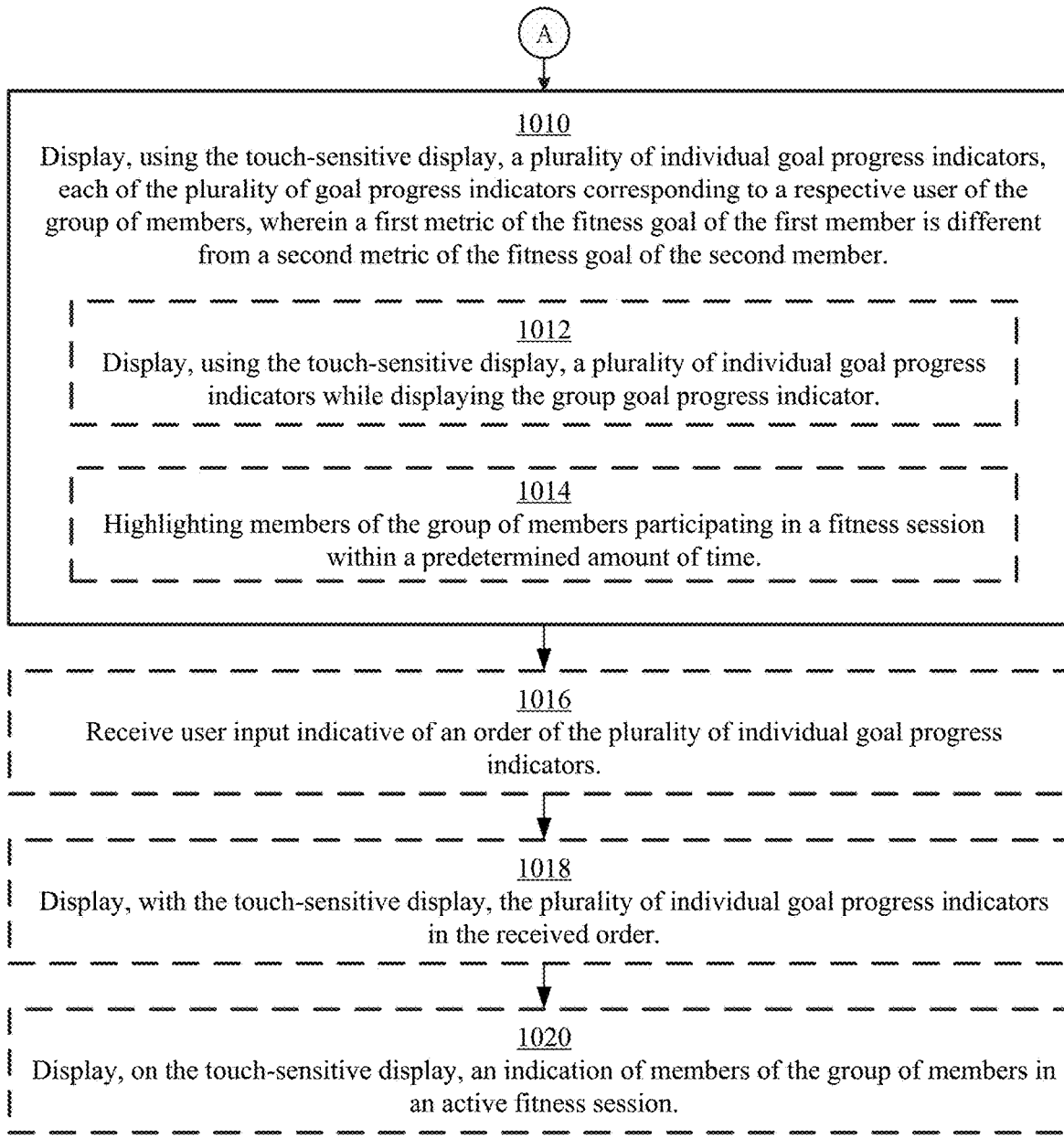

FIGS. 10A-B illustrate a process 1000 for displaying fitness progress according to various examples. Process 1000 is performed at a device (e.g., 100, 300, 500) having a user interface in some examples. Some operations in process 900 are, optionally, combined, and the order of some operations is, optionally, changed, and some operations are, optionally, omitted.

At block 1002, data indicative of an aggregate progress of a group of members in reaching their individual fitness goals is received. The aggregate progress can optionally be an average or weighted average of the completion percentage of each member of the group. Individual fitness goals can optionally include burning a predetermined number of calories, running a particular distance, exercising a predetermined amount of time, exercising a particular number of days over a period, and/or exercising a particular number of consecutive days. The data can optionally be received from an external device in some instances.

At block 1004, a group goal progress indicator, indicative of the aggregate progress of the group members, is displayed. The group goal progress indicator can optionally be displayed graphically or numerically. In some examples, the group goal progress indicator is displayed using a touch-sensitive display. In some examples, displaying the group goal progress indicator includes displaying at least one of a completion date or a completion time associated with the group goal progress indicator.

In some examples, individual goal progress of a wearer of the electronic device (e.g., smart watch) is determined. In some examples, the individual goal progress is determined using a sensor of the electronic device. The sensor can optionally be an accelerometer, heart rate monitor, or a pedometer in some examples.

At block 1010, a plurality of individual goal progress indicators are displayed. Each of the plurality of goal progress indicators can optionally correspond to a respective user of the group of members. In some examples, a first metric of the fitness goal of the first member is different from a second metric of the fitness goal of the second member. In some examples, displaying a plurality of individual goal progress indicators includes displaying a plurality of individual goal progress indicators while displaying the group goal progress indicator. In some examples, displaying a plurality of individual goal progress indicators includes highlighting members of the group of members participating in a fitness session within a predetermined amount of time.

In some examples, user input indicative of an order of the plurality of individual goal progress indicators is received. The plurality of individual goal progress indicators can optionally be displayed in the received order.

In some examples, an indication of members of the group of members in an active fitness session is displayed.

FIG. 11 illustrates a process for creating a fitness session according to various examples. Process 1100 is performed at a device (e.g., 100, 300, 500) having a user interface in some examples. Some operations in process 900 are, optionally, combined, and the order of some operations is, optionally, changed, and some operations are, optionally, omitted.

At block 1102, a selection of a fitness session having a fitness session type, a selection of members for participating in the fitness session, and a selection of a start time and duration of the fitness session are received for a fitness module app running on an electronic device, for instance, by a user interface. Fitness session types include group type, partner type, and trainer type. In some examples, members are selected by selecting from one or more members of a contact list.

At block 1104, notification transmit parameters for at least one of the members is configured. Configuring in this manner can optionally include providing an invitation to the fitness session to the selected members.

At block 1106, a set of notifications from at least one of the members is displayed at a rate. The rate is based on the fitness session type in some instances. In at least one example, displaying the set of notifications includes displaying different specificities of fitness data for each fitness session type. In some examples, displaying the set of notifications includes displaying non-specific fitness data for a team fitness session type.

In some examples, an automated response to at least one notification of the set of notifications is provided. Providing a response can optionally include providing an emoticon or canned answers.

In some examples, fitness data associated with at least one member is received. Fitness data received can optionally include fitness data associated with calories burned, distance ran, an activity type, or a duration of activity.

In some examples, a second set of notifications is provided to one or more of the members.

In some examples, fitness data from a wearable device, such as a smart watch, is received.

In some examples, fitness data is provided to at least one of the members.

In accordance with some embodiments, FIG. 12 shows an exemplary functional block diagram of an electronic device 1200 configured in accordance with the principles of the various described embodiments. In accordance with some embodiments, the functional blocks of electronic device 1200 are configured to perform the techniques described above. The functional blocks of the device 1200 are, optionally, implemented by hardware, software, or a combination of hardware and software to carry out the principles of the various described examples. It is understood by persons of skill in the art that the functional blocks described in FIG. 12 are, optionally, combined or separated into sub-blocks to implement the principles of the various described examples. Therefore, the description herein optionally supports any possible combination or separation or further definition of the functional blocks described herein.

As shown in FIG. 12, an electronic device 1200 includes a user interface 1202 and a processing unit 1208 coupled to the user interface 1202. In some embodiments, the processing unit 1208 includes a receiving module 1210, a notification control module 1212, a group tracking module 1214, and optionally, an associating module 1216, a display enabling module 1218, a storing module 1220, and a detecting module 1222.

The processing unit 1208 is configured to receive (e.g., with the receiving module 1210), by the user interface 1204, a group type selection input of a group type from among a plurality of group types; receive (e.g., with the receiving module 1210), by the user interface 1204, a member selection input of one or more group members; determine (e.g., with the notification control module 1212), fitness related notification receipt parameters for the one or more group members based on at least the selected group type, where the notification receipt parameters include at least one notification receipt frequency and at least one notification receipt information type; determine (e.g., with the notification control module 1212), fitness related notification transmit parameters for the one or more group members based on at least the selected group type, where the notification transmit parameters include at least one notification transmit information type; and create (e.g., with the group tracking module 1214), a group having the selected group type, the selected one or more group members, notification receipt parameters, and notification transmit parameters.

In some embodiments, determining fitness related notification receipt parameters for the one or more group members based on at least the selected group type comprises determining (e.g., with the notification control module 1212) fitness related notification receipt parameters for the one or more group members to enable a member of the one or more group members to asymmetrically receive fitness related notifications from one or more other group members.

In some embodiments, determining fitness related notification transmit parameters for the one or more group members based on at least the selected group type comprises determining (e.g., with the notification control module 1212) fitness related notification transmit parameters for the one or more group members to enable one or more group members to asymmetrically provide fitness related data to a member of the group of members.

In some embodiments, determining fitness related notification receipt parameters for the one or more group members based on at least the selected group type comprises determining (e.g., with the notification control module 1212) fitness related notification receipt parameters for the one or more group members enabling each group member to symmetrically receive data from one or more other group members.

In some embodiments, determining fitness related notification receipt parameters for the one or more group members based on at least the selected group type comprises determining (e.g., with the notification control module 1212) notification receipt parameters for the one or more group members based on a number of group members.

In some embodiments, the processing unit 1208 is further configured to associate (e.g., with the associating module 1216) a goal with the created group.

In some embodiments, receiving, by the user interface 1204, a member selection input of one or more group members includes enabling display (e.g., with the display enabling module 1216) of a list of contacts on the electronic device and receiving (e.g., with the receiving module 1210), by the user interface 1204, a selection of one or more contacts from the displayed list of contacts.

In some embodiments, receiving a member selection of the one or more contacts from the displayed list of contacts comprises enabling display (e.g., with the display enabling module 1216) of a list of contacts on the electronic device, the list providing an indication associating one or more contacts with a predetermined electronic device type, and receiving (e.g., with the user interface 1204) a selection of one or more contacts associated with the predetermined electronic device type.

In some embodiments, the predetermined device type is a wearable device including one or more sensors.

In some embodiments, the processing unit 1208 is further configured to store (e.g., with the storing module 1220) the group on the electronic device.

In some embodiments, each of the one or more group members is associated with a respective personalized fitness goal.

In some embodiments, the group is associated with a group goal and the group goal is based on a predetermined aggregate amount of fitness activity of the group members.

In some embodiments, the processing unit 1208 is further configured to detect (e.g., with the detecting module 1222), a proximity of a second electronic device and in accordance with a determination that the proximity of the second electronic device satisfies a predetermined threshold proximity, associate (e.g., with the associating module 1216) a member with the created group.

The operations described above with reference to FIGS. 9A-C are, optionally, implemented by components depicted in FIGS. 1A-1B or FIG. 12. For example, receiving operations 902 and 904, determining operations 914 and 922, and creating operation 926 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 13:
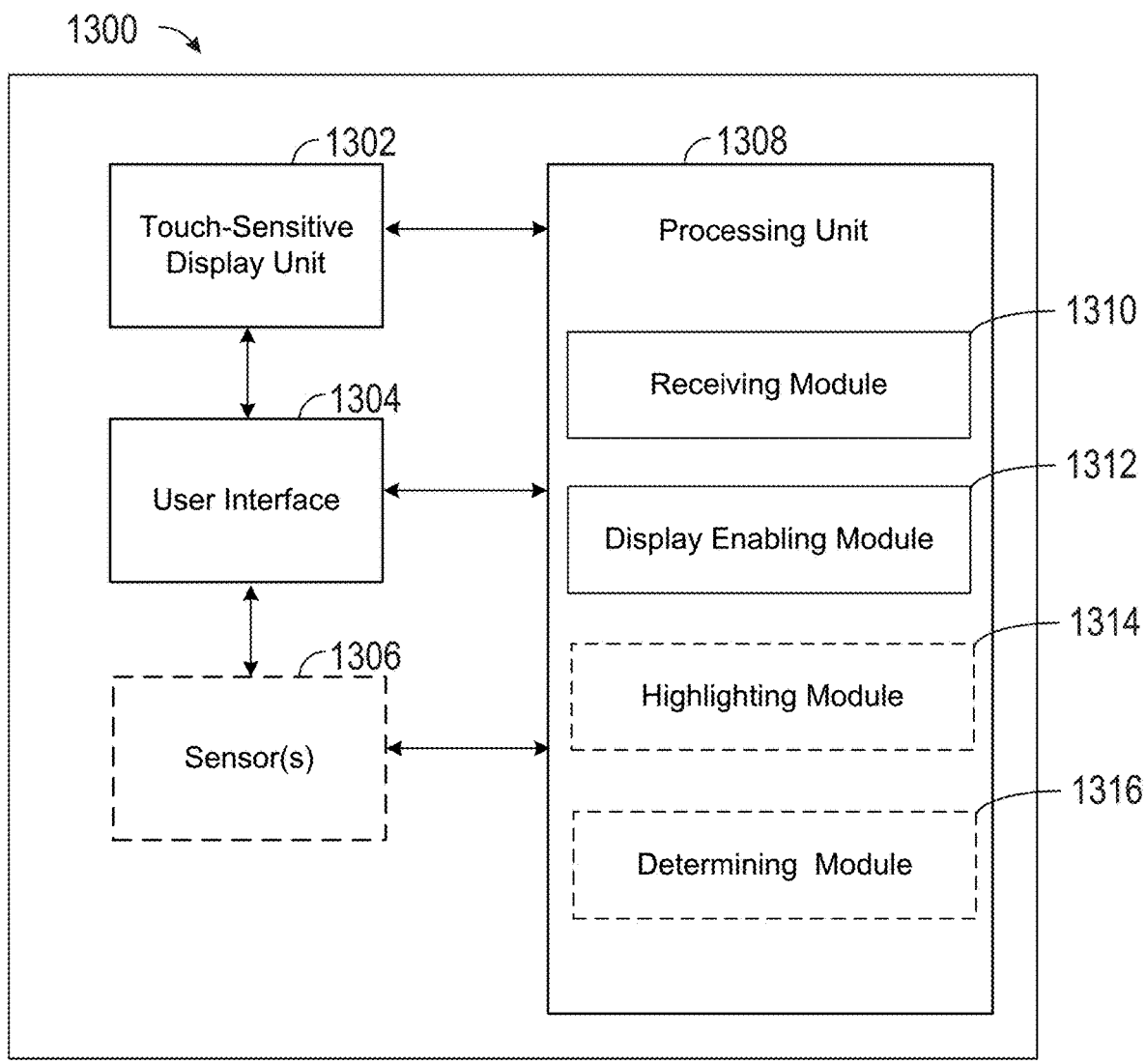
FIG. 13 illustrates a functional block diagram of an electronic device in accordance with some embodiments.

In accordance with some embodiments, FIG. 13 shows an exemplary functional block diagram of an electronic device 1300 configured in accordance with the principles of the various described embodiments. In accordance with some embodiments, the functional blocks of electronic device 1300 are configured to perform the techniques described above. The functional blocks of the device 1300 are, optionally, implemented by hardware, software, or a combination of hardware and software to carry out the principles of the various described examples. It is understood by persons of skill in the art that the functional blocks described in FIG. 13 are, optionally, combined or separated into sub-blocks to implement the principles of the various described examples. Therefore, the description herein optionally supports any possible combination or separation or further definition of the functional blocks described herein As shown in FIG. 13, an electronic device 1300 includes a touch-sensitive display 1302, a user interface 1304, optionally, one or more sensors 1306, and a processing unit 1308 coupled to the touch-sensitive display unit 1302, the user interface 1304, and optionally, the one or more sensors 1306. In some embodiments, the processing unit 1308 includes a receiving module 1310, a display enabling module 1312, and, optionally, a highlighting module 1314, and a determining module 1316.

The processing unit 1308 is configured to receive (e.g., with the receiving module 1310), from an external device, data indicative of an aggregate progress of a group of members in reaching each of their individual fitness goals; enable display (e.g., with the display enabling module 1312), of a group goal progress indicator, indicative of the aggregate progress of the group of members; and enable display (e.g., with the display enabling module 1312) of a plurality of individual goal progress indicators, each of the plurality of goal progress indicators corresponding to a respective user of the group of members, where a first metric of the fitness goal of the first member is different from a second metric of the fitness goal of the second member.

In some embodiments, a type of activity of a fitness goal of a first member of the group of members is different from a type of activity of a fitness goal of a second member of the group of members.

In some embodiments, the processing unit 1308 is further configured to enable display (e.g., with the display enabling module 1312), an indication of members of the group of members in an active fitness session.

In some embodiments, enabling display of a group goal progress indicator, indicative of the overall progress of a group of members in reaching each of their individual fitness goals, comprises enabling display (e.g., with the display enabling module 1312) of at least one of a completion date or a completion time associated with the group goal progress indicator.

In some embodiments, the processing unit 1308 is further configured to receive (e.g., with the receiving module 1310) user input indicative of an order of the plurality of individual goal progress indicators and enable display (e.g., with the display enabling module 1312) of the plurality of individual goal progress indicators in the received order.

In some embodiments, enabling display of a plurality of individual goal progress indicators comprises enabling display (e.g., with the display enabling module 1312) of a plurality of individual goal progress indicators while displaying the group goal progress indicator.

In some embodiments, enabling display of a plurality of individual goal progress indicators, each of the plurality of goal progress indicators corresponding to a respective member of the group of members comprises highlighting (e.g., with the highlighting module 1314) members of the group of members participating in a fitness session within a predetermined amount of time.

In some embodiments, the processing unit 1308 is further configured to determine (e.g., with the determining module 1316), individual goal progress of a wearer of the electronic device.

The operations described above with reference to FIGS. 10A-B are, optionally, implemented by components depicted in FIGS. 1A-1B or FIG. 13. For example, receiving operation 1002 and displaying operations 1004 and 1010 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186 and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 14:
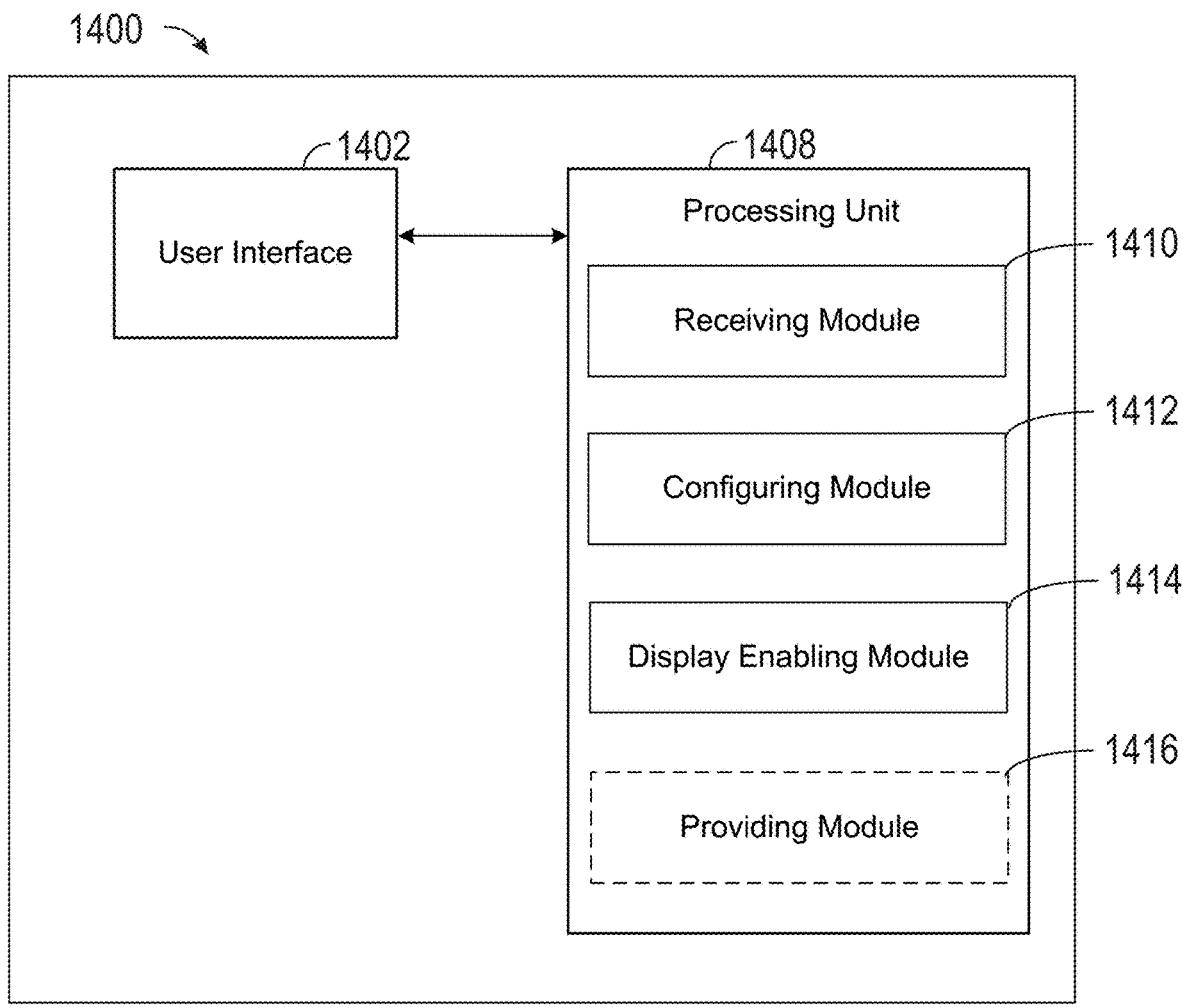
FIG. 14 illustrates a functional block diagram of an electronic device in accordance with some embodiments.

In accordance with some embodiments, FIG. 14 shows an exemplary functional block diagram of an electronic device 1400 configured in accordance with the principles of the various described embodiments. In accordance with some embodiments, the functional blocks of electronic device 1400 are configured to perform the techniques described above. The functional blocks of the device 1400 are, optionally, implemented by hardware, software, or a combination of hardware and software to carry out the principles of the various described examples. It is understood by persons of skill in the art that the functional blocks described in FIG. 14 are, optionally, combined or separated into sub-blocks to implement the principles of the various described examples. Therefore, the description herein optionally supports any possible combination or separation or further definition of the functional blocks described herein.

As shown in FIG. 14, an electronic device 1400 includes a user interface 1402, and a processing unit 1408 coupled to the user interface 1402. In some embodiments, the processing unit 1408 includes a receiving module 1410, a configuring module 1412, a display enabling module 1414, and, optionally, a providing module 1416.

The processing unit 1408 is configured to receive (e.g., with the receiving module 1410), by the user interface 1402, for a fitness module app running on the electronic device: a selection of a fitness session having a fitness session type; a selection of members for participating in the fitness session; and a selection of a start time and duration of the fitness session. The processing unit 1408 is configured to configure (e.g., with the configuring module 1412) notification transmit parameters for at least one of the members and enable display (e.g., with the display enabling module 1414) of a set of notifications from at least one of the members at a rate, wherein the rate is based on the fitness session type.

In some embodiments, the fitness session type is team, partner, trainer, or a combination thereof.

In some embodiments, the set of notifications is based on the fitness session type.

In some embodiments, the set of notifications is a first set of notifications and the processing unit 1408 is further configured to provide (e.g., with the providing module 1416) a second set of notifications to one or more of the members.

In some embodiments, the processing unit 1408 is further configured to provide (e.g., with the providing module 1416) an automated response to at least one notification of the set of notifications.

In some embodiments, the set of notifications includes a predetermined fitness challenge.

In some embodiments, the set of notifications is based on number of members selected.

In some embodiments, a number of notifications in the set of notifications is based on a number of members selected.

In some embodiments, the set of notifications includes a notification indicating a member has completed a fitness goal, a notification indicating a member has started a fitness session, a notification indicating a member has completed an achievement, or a combination thereof.

In some embodiments, the processing unit 1408 is further configured to receive (e.g., with the receiving module 1410) fitness data associated with at least one member.

In some embodiments, the processing unit is further configured to receive (e.g., with the receiving module 1410) fitness data from a wearable device and provide the fitness data to at least one of the members.

In some embodiments, enabling display of the set of notifications further comprises enabling display (e.g., with the display enabling module 1414) of different specificities of fitness data for each fitness session type.

In some embodiments, enabling display of the set of notifications further comprises enabling display (e.g., with the display enabling module 1414) of non-specific fitness data for a team fitness session type.

The operations described above with reference to FIG. 11 are, optionally, implemented by components depicted in FIGS. 1A-1B or FIG. 14. For example, receiving operation 1102, configuring operation 1104, and displaying operation 1106 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186 and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of invitational content or any other content that can optionally be of interest to them. The present disclosure contemplates that in some instances, this gathered data can optionally include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

What is claimed is:

1. A method, comprising:
    receiving, via a user interface of a computing device, selection of:
        information identifying one or more members for participating in a fitness session;
        a start time for the fitness session; and
        a duration of the fitness session;
    receiving, by the computing device, individual fitness metrics for the one or more members associated with the fitness session, the individual fitness metrics collected during a period of time corresponding to the start time and the duration of the fitness session;
    presenting, via the user interface, aggregate fitness data for the fitness session corresponding to the received individual fitness metrics for the one or more members associated with the fitness session during the period of time; and
    presenting, via the user interface, at least a subset of the received individual fitness metrics for the one or more members associated with the fitness session during the period of time.

2. The method of claim 1, further comprising receiving, via the user interface, a session type for the fitness session.

3. The method of claim 2, wherein presenting the aggregate fitness data comprises presenting non-specific fitness data for a team session type.

4. The method of claim 2, wherein presenting at least the subset of the received individual fitness metrics comprises presenting a set of notifications for a member of the one or more members at a rate.

5. The method of claim 4, wherein the rate is based at least in part on the session type for the fitness session.

6. The method of claim 4, wherein presenting the set of notifications comprises displaying different specificities of fitness data for each session type.

7. The method of claim 4, further comprising providing an automated response to at least one notification of the set of notifications.

8. The method of claim 1, further comprising:
    identifying at least one member of the one or more members; and
    configuring notification transmit parameters for the at least one member.

9. The method of claim 8, further comprising providing an invitation to the at least one member to join the fitness session.

10. The method of claim 1, wherein the information identifying the one or more members is selected from a list of contacts of a user account associated with the computing device.

11. A computer-readable storage medium, storing computer-executable instructions that, when executed by one or more processors of a computing device, configure the one or more processors to perform operations comprising:
    receiving, via a user interface, selection of:
        information identifying one or more members for participating in a fitness session;
        a start time for the fitness session; and
        a duration of the fitness session;
    receiving individual fitness metrics for the one or more members associated with the fitness session, the individual fitness metrics collected during a period of time corresponding to the start time and the duration of the fitness session;
    presenting, via the user interface, aggregate fitness data for the fitness session corresponding to the received individual fitness metrics for the one or more members associated with the fitness session during the period of time; and
    presenting, via the user interface, at least a subset of the received individual fitness metrics for the one or more members associated with the fitness session during the period of time.

12. The computer-readable storage medium of claim 11, wherein the operations further comprise receiving, via the user interface, a session type for the fitness session.

13. The computer-readable storage medium of claim 12, wherein presenting the aggregate fitness data comprises presenting non-specific fitness data for a team session type.

14. The computer-readable storage medium of claim 12, wherein presenting at least the subset of the received individual fitness metrics comprises presenting a set of notifications for a member of the one or more members at a rate.

15. The computer-readable storage medium of claim 14, wherein the rate is based at least in part on the session type for the fitness session.

16. The computer-readable storage medium of claim 14, wherein presenting the set of notifications comprises displaying different specificities of fitness data for each session type.

17. The computer-readable storage medium of claim 14, wherein the operations further comprise providing an automated response to at least one notification of the set of notifications.

18. A system, comprising:
    one or more memories configured to store computer-executable instructions; and
    one or more processors configured to access the one or more memories and execute the computer-executable instructions to at least:
        receive, via a user interface, selection of:

information identifying one or more members for participating in a fitness session;

a start time for the fitness session; and a duration of the fitness session;

receive individual fitness metrics for the one or more members associated with the fitness session, the individual fitness metrics collected during a period of time corresponding to the start time and the duration of the fitness session;

present, via the user interface, aggregate fitness data for the fitness session corresponding to the received individual fitness metrics for the one or more members associated with the fitness session during the period of time; and present, via the user interface, at least a subset of the received individual fitness metrics for the one or more members associated with the fitness session during the period of time.

19. The system of claim 18, wherein presenting the aggregate fitness data comprises presenting non-specific fitness data for a team session type received via the user interface.

20. The system of claim 18, wherein presenting at least the subset of the received individual fitness metrics comprises presenting a set of notifications for a member of the one or more members at a rate, the rate being based at least in part on a session type received via the user interface.

* * * * *